(12) United States Patent
Takeuchi et al.

(10) Patent No.: US 9,014,600 B2
(45) Date of Patent: Apr. 21, 2015

(54) DEVELOPING ROLLER, DEVELOPING APPARATUS, AND IMAGE-FORMING DEVICE

(75) Inventors: Tomoharu Takeuchi, Saitama (JP); Taichi Ohkubo, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 13/976,190

(22) PCT Filed: Feb. 24, 2011

(86) PCT No.: PCT/JP2011/001062
§ 371 (c)(1),
(2), (4) Date: Jun. 26, 2013

(87) PCT Pub. No.: WO2012/098590
PCT Pub. Date: Jul. 26, 2012

(65) Prior Publication Data
US 2013/0272755 A1    Oct. 17, 2013

(30) Foreign Application Priority Data

Jan. 19, 2011  (JP) ................................. 2011-008528

(51) Int. Cl.
*G03G 15/08*  (2006.01)
*C09D 175/04*  (2006.01)
(Continued)

(52) U.S. Cl.
CPC .......... *G03G 15/0806* (2013.01); *C09D 175/04* (2013.01); *G03G 15/0818* (2013.01); *C08G 18/73* (2013.01); *C08K 3/04* (2013.01); *C08K 3/36* (2013.01); *C09D 175/06* (2013.01); *C08G 18/4238* (2013.01); *C08K 2201/001* (2013.01); *C09D 7/1216* (2013.01); *C09D 7/125* (2013.01); *C08L 27/18* (2013.01)

(58) Field of Classification Search
CPC .................................................. G03G 15/0818
USPC .......................................................... 399/286
See application file for complete search history.

(56) References Cited

U.S. PATENT DOCUMENTS 4,810,564 A * 3/1989 Takahashi et al. ............ 428/213
7,512,358 B2   3/2009 Tanabe
(Continued)

FOREIGN PATENT DOCUMENTS

JP           4147166 A    5/1992
JP       2002194278 A    7/2002
(Continued)

*Primary Examiner* — Billy Lactaoen
*Assistant Examiner* — Arlene Heredia Ocasio
(74) *Attorney, Agent, or Firm* — The Webb Law Firm (57) ABSTRACT

Provided are a developing roller having an elastic layer formed on an outer circumferential face of a shaft and a coating layer formed on an outer circumferential face of the elastic layer, wherein the coating layer is composed of first coating layers that are formed at respective edges across the elastic layer, and a second coating layer formed between the first coating layers, and wherein the first coating layers contain a resin obtained through a reaction of a polyol with a silane-coupling agent, fluororesin particles, and an electric conductivity agent; and the second coating layer contains a urethane resin, an ionic liquid, an electric conductivity agent, and filler particles; and a development apparatus and an image-forming device having the developing roller. The provided are capable of keeping the image quality high and of arresting leakage of the toner satisfactorily.

10 Claims, 2 Drawing Sheets (51) Int. Cl.

| | | |
|---|---|---|
| *C08G 18/73* | (2006.01) | |
| *C09D 175/06* | (2006.01) | |
| *C08G 18/42* | (2006.01) | |
| *C09D 7/12* | (2006.01) | |
| C08K 3/04 | (2006.01) | |
| C08K 3/36 | (2006.01) | |
| C08L 27/18 | (2006.01) | |

(56) References Cited

U.S. PATENT DOCUMENTS

| | | | |
|---|---|---|---|
| 8,086,134 B2 | 12/2011 | Xu et al. | |
| 8,277,692 B2 * | 10/2012 | Marui et al. | 252/511 |
| 2003/0123899 A1 * | 7/2003 | Kamimura | 399/103 |
| 2009/0180818 A1 * | 7/2009 | Hamakawa et al. | 399/286 |
| 2010/0098464 A1 * | 4/2010 | Suzuki et al. | 399/286 |
| 2011/0091240 A1 * | 4/2011 | Anan et al. | 399/111 |
| 2012/0134714 A1 * | 5/2012 | Takeuchi et al. | 399/176 |
| 2012/0201568 A1 * | 8/2012 | Kurachi et al. | 399/111 |
| 2013/0089362 A1 * | 4/2013 | Kuroda et al. | 399/286 |

FOREIGN PATENT DOCUMENTS

| | | |
|---|---|---|
| JP | 2003186299 A | 7/2003 |
| JP | 2004191430 A | 7/2004 |
| JP | 2005220317 A | 8/2005 |
| JP | 2007140139 A | 6/2007 |
| JP | 2009265574 A | 11/2009 |
| JP | 2010237445 A | 10/2010 |

* cited by examiner

DEVELOPING ROLLER, DEVELOPING APPARATUS, AND IMAGE-FORMING DEVICE

CROSS REFERENCE TO RELATED APPLICATION

This application claims the benefit of International Patent Application No. PCT/JP2011/001062 entitled "Developing Roller, Developing Device, and Image Formation Device", which claims priority to Japanese Application No. 2011-008528, filed Jan. 19, 2011, which are hereby incorporated by reference in their entirety.

TECHNICAL FIELD

The present invention relates to a developing roller, a development apparatus, and an image-forming device. More specifically, the present invention relates to a developing roller, a development apparatus, and an image-forming device capable of keeping the image quality high and of arresting the leakage of toner satisfactorily.

BACKGROUND ART

The development apparatus, which is mounted in an image-forming device, is often equipped with a sealing member for preventing toner leaks, the member sliding on each end of the developing roller so that the toner is prevented from leaking to the outside of the development apparatus, so that the development apparatus, the image-forming device and recording materials are kept from stains. Nevertheless, the toner sometimes leaks from around the ends of the developing roller. The leakage of the toner notably occurs especially in high-temperature and high-humidity environments.

Some techniques to address this problem have been proposed. For example, patent document 1 discloses "a single-component development apparatus comprising a toner container for containing a toner; a toner carrier, which is rotatably supported at an opening of the toner container, for carrying and conveying the toner; a supplying roller for supplying the toner to the toner carrier; and a toner-controlling member, which contacts the developing roller, for controlling the toner that is carried and conveyed by the toner carrier, wherein the development apparatus has a metal shaft coated with resin, and the axial extent of the resin-coated area of the toner carrier is limited within sealing members placed on both ends of the toner carrier".

Also, patent document 2 discloses "a developing roller for an electrographic printer, which carries toner on an outer circumferential face of the roller, comprising a roller member held so as to be rotatable; a conductive member made of a conductive material, which is placed in the development area of the circumferential face of the roller member and carries toner thereon; and a non-conductive member made of a non-conductive material, which is placed on an end of the conductive member and prevents adherence of the toner".

In addition to the prevention of the leakage of toner, the development apparatus is required to form high quality images. For example, patent document 3 specifically teaches "a developing roller comprising a base layer including silicone polymer and 1-hexyl-3-methylimidazolium trifluoromethanesulfonate" to prevent image irregularities (Working Example 16).

PRIOR ART DOCUMENTS

Patent Documents

Patent Document 1: JP 2003-186299 A
Patent Document 2: JP 2004-191430 A
Patent Document 3: JP 2005-220317 A

DISCLOSURE OF THE INVENTION

Problems to be Solved by the Invention

When the humidity around a developing roller is lowered, the developing roller is not capable of supplying a predetermined amount of toner with a predetermined amount of electric charge to a member that carries images. As a result, this situation may cause a phenomenon called "fogging", or fixation of unnecessary toner on a print such as a solid white print, which is also called a solid print. This phenomenon is very noticeable when color images are printed after monochrome images are printed. As explained hereinbefore, when the conditions of the area surrounding developing rollers installed in an image-forming device are changed, for example, the humidity around developing rollers is lowered, a desired image may not be obtained.

Furthermore, the inventors' study revealed that there was a trade-off between the prevention of toner leaks and the image quality, as far as developing rollers having a base layer that contained ionic liquid were concerned.

In view of the foregoing situations, the present invention has an objective to provide a developing roller, a development apparatus, and an image-forming device capable of keeping the image quality high yet arresting toner leaks satisfactorily.

Means to Solve the Problems

As means for solving the aforementioned problem, the present invention provides a developing roller comprising an elastic layer formed on an outer circumferential face of a shaft and a coating layer formed on an outer circumferential face of the elastic layer, wherein the coating layer comprises first coating layers formed at respective edges across the elastic layer, and a second coating layer formed between the first coating layers, and wherein the first coating layers contain a resin obtained through a reaction of a polyol with a silane-coupling agent, particles of a fluororesin, and an electric conductivity agent, wherein the first coating layers do not essentially contain ionic liquid; and the second coating layer contains a urethane resin, at least one ionic liquid selected from the group consisting of pyridinium ionic liquids and amine ionic liquids, an electric conductivity agent, and filler particles.

The amount of the particles of the fluororesin can be from 10 to 50 parts by mass to 100 parts by mass of the resin.

The amount of the ionic liquid contained in the second coating layer can be from 1 to 20 parts by mass to 100 parts by mass of the urethane resin.

The invention is also a development apparatus comprising the developing roller discussed above, sealing members for preventing toner leaks, the members sliding on respective edges of an outer circumferential face of the developing roller, and a toner-controlling member extending along the axis of the developing roller and contacting the circumferential face thereof to control a thickness of the toner carried by the developing roller.

Each of the first coating layers of the developing roller can be arranged so that the first coating layer slides on one of the seal members and on the toner-controlling member.

The invention is also an image-forming device comprising the development apparatus discussed above, and an image carrier held so as to face the developing roller.

Advantages of the Invention

The developing roller of the invention, which has the coating layer with the aforementioned first coating layers and second coating layer on the outer circumferential face of the elastic layer, is capable of effectively preventing toner leaks in high-humidity environments as well as in normal humidity environments, for example, an environment with about 50% relative humidity, and essentially arresting the occurrence of fogging in low-humidity environments as well as normal humidity environments. Thus the developing roller contributes to the formation of high quality images. Therefore the present invention provides a developing roller, a development apparatus, and an image-forming device capable of keeping the image quality high yet arresting toner leaks satisfactorily.

BEST MODE TO CARRY OUT THE INVENTION

The developing roller of the present invention has an elastic layer formed on an outer circumferential face of a shaft, and a coating layer formed on an outer circumferential face of the elastic member. When this coating layer has first coating layers, which will be explained hereinafter, and a second coating layer between the first coating layers, preferably sandwiched between them in such a manner that the second coating layer contacts the first coating layers, the objective of the present invention will be achieved favorably, as explained hereinbefore. In this specification, high-humidity environments denote those where the relative humidity is, for example, from 70 to 90%, and low-humidity environments denote those where the relative humidity is, for example, 20% or less, preferably 15% or less in which environments the objective of the invention is favorably achieved.

Figure 1:
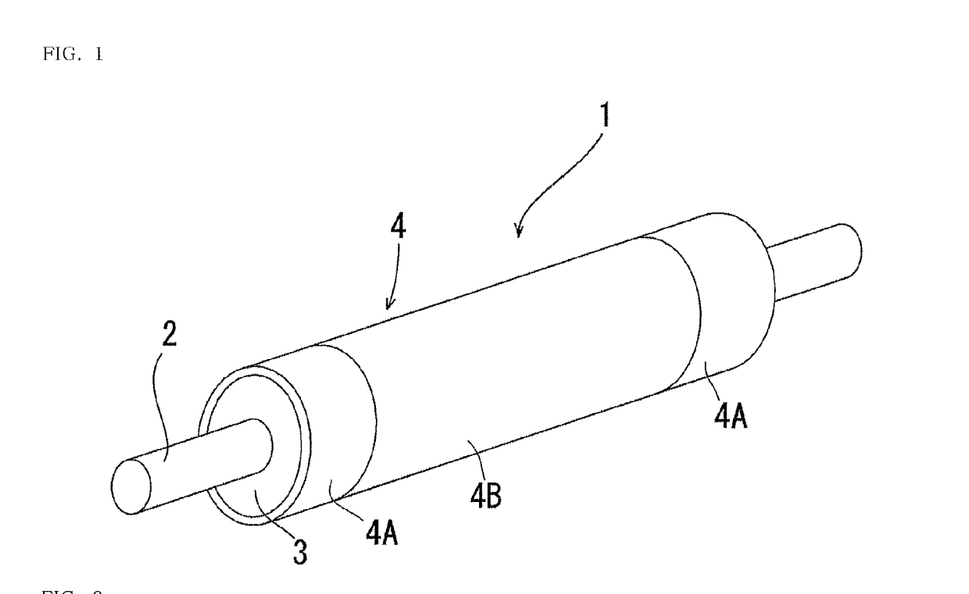
FIG. 1 is a perspective view showing an example of the developing roller according to the present invention.

The developing roller of the present invention will be explained hereinafter with the aid of an example. A developing roller 1, which is an example of the present invention, is provided with a shaft 2, an elastic layer 3, and a coating layer 4, as shown in FIG. 1.

The shaft 2 is essentially the same as a shaft employed in conventionally known developing rollers. The shaft 2 is one known as "cored bar", made of metal such as iron, aluminum, stainless steel, or brass. The cored bar has excellent properties of electric conductivity. The shaft may have a core of an electrical insulator, such as thermoplastic resin or thermosetting resin, the core being metal plated so as to be electrically conductive.

The elastic layer 3 is essentially the same as an elastic layer employed in conventionally known developing rollers. An electrically conductive material, which will be explained hereafter, is cured on the outer circumferential face of the shaft 2, and the elastic layer 3 is thus made. The elastic layer should preferably have a JIS A hardness of 20 to 70. The elastic layer with a JIS A hardness, or hardness according to JIS K6301, of 20 to 70, will be able to enlarge the contact area between the developing roller 1 and the thing being contacted. Also, the elastic layer 3 is excellent in impact resilience and compression set.

The elastic layer 3 should preferably have a volume resistivity in the range of $10^1$ to $10^7$ Ω·cm, and/or an electrical resistivity in the range of $10^1$ to $10^9$Ω. When the volume resistivity and/or electrical resistivity of the elastic layer 3 is in the aforementioned range, it contributes to carrying and supplying a toner in a desired way and forming an image with a desired quality once the developing roller 1 is installed in an image-forming device. The volume resistivity may be measured with a method according to JIS K6911, with an applied volume of 100 V. The electrical resistivity may be measured with an ohmmeter, such as one whose product name is ULTRA HIGH RESISTANCE METER R8340A, manufactured by ADVANTEST CORPORATION, by the following method: The developing roller 1 is placed horizontally. As an electrode is used a gold-plated board-like member with a thickness of 5 mm, a width of 30 mm and a length sufficient to receive the entire length of the elastic layer 3 of the developing roller 1 on the member. With each end of the shaft 2 of the developing roller 1 loaded with 500 g, a voltage of DC 100V is applied between the shaft 2 and the electrode. The value indicated by the ohmmeter one second after the application of the voltage is read, and the value is regarded as the electrical resistivity.

The elastic layer 3 should preferably have at least one of the following physical properties: an elongation from 300% to 1200% and a breaking strength from 3 to 25 MPa. Meeting this requirement, the elastic layer 3 contributes to the formation of images free from fogging under low-humidity environments when the developing roller 1 is installed in an image-forming device. It will be particularly preferable if the elastic layer 3 has both physical properties. The elongation is more desirably from 400 to 800%, particularly desirably from 500 to 800%. The elastic layer 3 with an elongation within the range makes it possible to avoid damaging a toner that passes through the contact area between the developing roller 1 and a thing being contacted, such as a photoconductor drum, when the developing roller 1 is fixed to an image-forming device in such a manner that the contact area is large. The elastic layer with such an elongation greatly contributes to the formation of images free from fogging even under low-humidity environments. The breaking strength should be more desirably from 10 to 25 MPa, particularly desirably from 15 to 25 MPa. The elastic layer 3 with a breaking strength within the range makes it possible to avoid placing such a large load on the developing roller 1 as to break the roller, when the developing roller 1 is fixed to an image-forming device in such a manner that the contact area between the developing roller 1 and a thing being contacted, such as a photoconductor drum, is large. The elastic layer with such a breaking strength greatly contributes to the formation of images free from fogging even under low-humidity environments. The elongation and the breaking strength may be measured with a method according to JIS K7113, using test pieces each with 10 mm in width, 50 mm in length, and 40 μm in thickness, cut out of the elastic layer 3 of the developing roller 1, or test pieces each with 10 mm in width, 50 mm in length, and 40 μm in thickness, made of a rubber composition of which the elastic layer 3 is made, under the conditions where the measurement temperature is 25° C.±2° C., the tension rate is 100 mm/minute, and the distance between the test-piece holders is 50 mm. In order to adjust the elongation and breaking strength of the elastic layer 3 to the respective ranges indicated hereinbefore may be employed, for example, a method of adjusting the amount of a filler or inorganic filler in the electrically conductive composition, which will be explained hereinafter, or a method of adjusting the amount of (D) an organohydrogenpolysiloxane included in an addition-cure liquid electrically conductive silicone rubber composition, which will be explained hereinafter.

The elastic layer 3 preferably has a thickness of not less than 1 mm, because this thickness will ensure a uniform nip width between the elastic layer 3 and the thing being contacted when they contact each other. It will be more preferable if the elastic layer 3 has a thickness of not less than 5 mm. On the other hand, there is no limitation on the upper limit of the thickness as long as the accuracy of the outer diameter of a cylinder made by the shaft and the elastic layer 3 is not marred. However, when the thickness of the elastic layer 3 is increased too large, the cost of producing the elastic layer 3 is also increased. From the viewpoint of practical cost, the thickness of the elastic layer 3 should be preferably not more than 30 mm, more preferably not more than 20 mm. The thickness of the elastic layer 3 is properly decided depending on the hardness of the elastic layer 3, for example, according to JIS A hardness, so that the desired nip width will be achieved.

Figure 2:
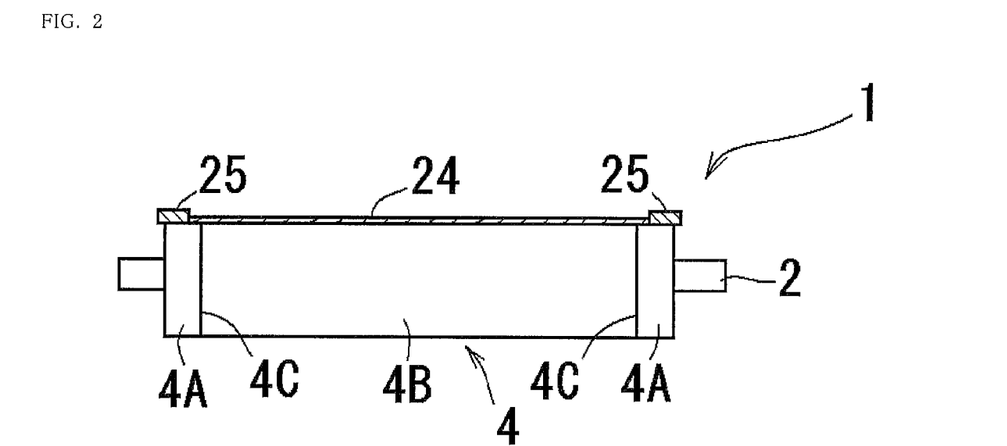
FIG. 2 is a schematic diagram partly in section, illustrating how the developing roller is arranged in the development apparatus according to the present invention.

As shown in FIGS. 1 and 2, the coating layer 4 is composed of first coating layers 4A formed on an outer circumferential face of the elastic layer 3 at both edges across the elastic layer, and a second coating layer 4B formed on the outer circumferential face of the elastic member 3 between the first coating layers 4A. When the first coating layers 4A are arranged on the outer circumferential face of the elastic layer 3 at both edges across the elastic layer, the amount of a toner physically adhering to the first coating layers 4A is remarkably reduced even at high temperatures and the adhering toner is prevented from leaving the developing roller 1 and leaking from the roller.

The first coating layers 4A are formed on the outer circumferential face of the elastic layer 3 at both edges across it. Preferably, each first coating layer 4A is formed on the outer circumferential face of the elastic member 3A so that it extends toward the central portion of the elastic member, beyond the region that contacts a toner-sealing member 25 when the developing roller is installed in the development apparatus. More specifically, each first coating layer is formed on the outer circumferential face of the elastic member so that a center-side end 4C of each first coating layer 4A extends farther than the toner-sealing member 25 toward the central portion of the elastic member and reaches an inside of a toner-controlling member 24 with which the toner-sealing member is arranged. In other words, each first coating layer 4A is formed on the outer circumferential face of the elastic layer 3 at the region that contacts the toner-sealing member 25 and the toner-controlling member 24 when the developing roller is installed in the development apparatus. In more detail, when the developing roller is installed in an image-forming device for forming an image on A3 paper sheets according to the JIS Standards, each first coating layer 4A is formed on an edge portion of the outer circumferential face, the edge portion having a width of 5-15 mm from the edge of the elastic layer 3 toward the central portion thereof, although the specific width of the portion varies depending on the length of the shaft. Generally, it is supposed that toner leaks are prone to occur at the boundaries between the toner-sealing member 25 and the toner-controlling member 24. However, the developing roller 1, with the first coating layers 4A each of which is formed so as to extend beyond the boundary, is capable of remarkably reducing the amount of a toner at around the boundary; a toner at around the boundary is liable to physically adhere to sheets. Thus the developing roller is capable of preventing toner leaks to a high degree.

The first coating layers 4A contain a resin obtained through a reaction of a polyol with a silane-coupling agent, particles of a fluororesin, and an electric conductivity agent, wherein ionic liquid, which will be explained hereinafter, is not essentially contained. The requirement "ionic liquid is not essentially contained" of this invention means that the first coating layers 4A do not intentionally contain ionic liquid, and it covers a situation where the first coating layers contain ionic liquid in such an amount that the ionic liquid does not show its properties, as well as a situation where the first coating layers contain no ionic liquid. A possible case of the situation where the first coating layers contain ionic liquid in such an amount that the ionic liquid does not show its properties is, for example, that ionic liquid contained in the second coating layer 4B permeates into the first coating layers 4A and remains in the layers. The amount of ionic liquid that does not allow the liquid to exhibit its properties may be, for example, not more than 0.1 part by mass to 100 parts by mass of the resin obtained through a reaction of a polyol with a silane-coupling agent.

The resin obtained through a reaction of a polyol with a silane-coupling agent, which may sometimes be called simply "the resin" hereinafter, is contained as a main component in the first coating layers 4A in an amount of, for example, not less than 50% by mass to the entire mass of the first coating layers 4A. This resin contained in the first coating layers 4A as a main component, or the base polymer, enables the first coating layers 4A to follow deformation of the elastic layer 3 to a high degree and may arrest cracks in them or their detachment from the elastic layer. This resin may be any resin produced by a reaction of a polyol with a silane-coupling agent. Although various polyols may be used for the polyol, preferable is a polyol that is essentially the same as the polyol for the urethane resin. Polyester polyols and polyether polyols are more desirable.

The silane-coupling agent may be any silane-coupling agent as long as it has substituents capable of reacting with hydroxyl groups of the polyol, such as an organic group having an epoxy group, a vinyl group, and a (meth)acryloyl group, as well as alkoxy groups. Examples of the silane-coupling agent may include silane-coupling agents with a γ-glycidoxypropyl group, those with a vinyl group, and those with γ-methacryloxypropyl group. Specific examples of such silane-coupling agents may include γ-glycidoxypropyltrimethoxysilane, γ-glycidoxypropyltriethoxysilane, γ-glycidoxypropylmethyldimethoxysilane, γ-glycidoxypropylmethyldiethoxysilane, vinyltrichlorosilane, vinyltrimethoxysilane, γ-methacryloxypropylmethyldimethoxysilane, and γ-methacryloxypropyltrimethoxysilane.

The resin is obtained through a reaction of the hydroxyl groups of the polyol and the substituents of the silane-coupling agent. The reaction may be carried out at temperatures of, for example, from 120° C. to 160° C.

The fluororesin particles are particles made of a fluororesin. There is no special limitation on the fluororesin, and normally used fluororesins, such as PTFE (polytetrafluoroethylene), PFA (perfluoroalkoxy resin), FEP (tetrafluoroethylene-hexafluoropropylene resin), PVdF (polyvinylidene fluoride resin), and PVF (polyvinyl fluoride). The fluororesin particles contained in the first coating layers 4A enhance durability, reduce an amount of physically adsorbed toner, and increase an amount of statically adsorbed toner. Due to these advantages, the amount of toner detached outside the development apparatus is capable of being decreased, and the toner is capable of being uniformly charged and statically adsorbed to be strongly held. As a result, the toner is prevented from leaking to the outside of the development apparatus in high-humidity environments as well as in normal-temperature environments. The fluororesin particles should have a particle diameter preferably from 0.1 to 2 μm, which enables uniform dispersion of the particles in the first coating layers 4A, particularly preferably from 0.1 to 1.5 μm. The particle diameter may be measured by a light-scattering method. The amount of the fluororesin particles contained in the first coating layers should be from 23 to 47 parts by mass to 100 parts by mass of the resin, because the fluororesin in an amount within this range is capable of providing the first coating layers 4A with both of lubricity and flexibility at a high level, and preventing toner from leaking to the outside of the development apparatus. The amount should be more desirably from 10 to 47 parts by mass, particularly desirably from 23 to 47 parts by mass.

The fluororesin for the present invention should preferably have electric charge opposite the electric charge of the toner that is included in the development apparatus, because the fluororesin statically adsorb the toner to effectively prevent toner leaks even in high-humidity environments. For example, when the toner in the development apparatus is a positively charged one, the fluororesin should be a negatively charged one. The first coating layers 4A thus containing a fluororesin with electric charge opposite the electric charge of the toner is capable of effectively preventing toner leaks even in high-humidity environments. The inventors suppose the reason for this advantage in the following way: The toner adsorbed on the developing roller 1 by electrostatic attraction sometimes discharges its electric charge in high-humidity environments, and the toner becomes prone to leave the developing roller 1. However, the fluororesin with electric charge opposite the electric charge of the toner, which is contained in the first coating layers 4A, compensates for the lost charge and serves to maintain strong adsorption through electrostatic attraction.

Among the fluororesins listed hereinbefore, negatively charged are, for example, PTFE, PFA, PVdF and PVF. Various known resins may be used as positively charged fluororesins.

The first coating layers 4A contain an electric conductivity agent. Therefore the first coating layers 4A may also be called first electrically conductive coating layers. There is no special limitation on the electric conductivity agent, as long as it is not an ionic liquid, which will be explained hereinafter, and it has electric conductivity. Examples of the electric conductivity agent may include electrically conductive powders of electrically conductive carbon, carbons for rubber, metals, and electrically conductive polymers. The first coating layers 4A with the electric conductivity agent are capable of effectively preventing occurrence of fogging at the first coating layers 4A and at around the boundaries between each first coating layer 4A and the second coating layer 4B. The electric conductivity agent should preferably be in the form of particles whose particle diameter should preferably be from 0.01 to 1 μm, because the particles with a diameter within the range are capable of being uniformly dispersed in the first coating layers 4A. The particle diameter is an arithmetic mean of the diameters of particles, which may be obtained by observation with an electron microscope. The electric conductivity agent should be contained in an amount from 5 to 10 parts by mass to 100 parts by mass of the resin obtained through a reaction of the polyol with the silane-coupling agent, because the agent in an amount within the range enables the first coating layers 4A to show desired electric conductivity and to prevent the occurrence of fogging in low-humidity environments.

The first coating layers 4A may contain various resin compositions, for example, various additives normally used in various resin compositions. Examples of the additives may include acrylic emulsions.

Each first coating layer 4A should have a thickness normally from 0.1 to 50 more desirably from 0.1 to 25 μm.

When the first coating layers 4A contain a resin obtained through a reaction of a polyol with a silane-coupling agent, particles of a fluororesin, and an electric conductivity agent, and they do not essentially contain ionic liquid, it is difficult for a toner in an excessive amount carried on the outer circumferential surface of the second coating layer 4B, if such an excessive amount of a toner is carried on the second coating layer, to move from the second coating layer 4B to the first coating layers 4A. As a result, toner leaks from the edges across the width of the developing roller 1 are substantially checked.

The second coating layer 4B is formed between the first coating layers 4A, or on the central portion of the elastic layer 3 so that the layer 4B contacts each of the first coating layers 4A. As shown in FIG. 2, the second coating layer 4B should preferably be formed on the outer circumferential face of the elastic member 3 so that the second coating layer is arranged more inside than the edges of the toner-controlling member 24 when the developing roller is installed in the development apparatus. In other words, the second coating layer 4B is formed in an image-forming region that corresponds to a latent image-forming region of the image carrier on which an electrostatic latent image is formed. In more detail, when the developing roller is installed in an image-forming device for forming an image on A3 paper sheets according to the JIS Standards, each first coating layer 4A is formed on an edge portion of the outer circumferential face, the edge portion having a width of 5-15 mm from the edge of the elastic layer 3 toward the central portion thereof, although the specific width of the portion varies depending on the length of the shaft. The developing roller 1, with the second coating layer 4B thus formed, is capable of preventing toner leaks to a high degree and of keeping the image quality high even in low-humidity environments.

The second coating layer 4B contains a urethane resin, at least one ionic liquid selected from the group consisting of pyridinium ionic liquids and amine ionic liquids, an electric conductivity agent, and filler particles. The urethane resin is contained as a main component in the second coating layer 4B in an amount of, for example, not less than 50% by mass to the entire mass of the second coating layer 4B. This urethane resin contained in the second coating layer 4B as a main component, or the base polymer, enables the second coating layer 4B to follow deformation of the elastic layer 3 to a high degree and may arrest cracks in it or its detachment from the elastic layer. This urethane resin may be any known urethane resin, normally produced from a polyol and a polyisocyanate. In order to achieve the objective of the present invention sufficiently, the polyol should preferably be a polyester polyol or a polyether polyol. Also, the polyisocyanate may be, for example, an aliphatic polyisocyanate or an aryl polyisocyanate.

The ionic liquid is at least one selected from the group consisting of pyridinium ionic liquids and amine ionic liquids. The ionic liquid is a sort of an onium salt, a liquid compound which has high electric conductivity and which is in a liquid state at a temperature of at least around room temperature. When the second coating layer 4B contains at least one ionic liquid selected from the group consisting of pyridinium ionic liquids and amine ionic liquids, it is capable of essentially preventing the occurrence of fogging in low-humidity environments and capable of maintaining a desired print density for a long time, which contributes to the formation of high quality images.

Although the ionic liquid may be at least one selected from the group consisting of pyridinium ionic liquids and amine ionic liquids, the ionic liquid should preferably be at least one selected from the pyridinium ionic liquids. It is because pyridinium ionic liquids are capable of essentially preventing the occurrence of fogging in low-humidity environments and capable of maintaining a desired print density for a long time.

The pyridinium ionic liquids are those including pyridinium ions, as cations, each pyridinium ion formed from a pyridine ring whose nitrogen atom is bonded with a substituent such as an alkyl group. The alkyl group may preferably be a straight-chain alkyl group with 1 to 18 carbon atoms, which may have substituents, or a branched-chain or cyclic alkyl group. Particularly preferable is a straight-chain alkyl group with 4 to 18 carbon atoms. Examples of the alkyl group may include methyl, ethyl, propyl, isopropyl, butyl, isobutyl, sec-butyl, tert-butyl, pentyl, neopentyl, hexyl, isohexyl, decyl, dodecyl, octadecyl, cyclopentyl and cyclohexyl.

The pyridine ring may be an alkyl-substituted pyridine ring wherein at least one of the hydrogen atoms bonded to the carbon atoms that form the ring is replaced with an alkyl group. A single alkyl group or alkyl groups may replace a hydrogen atom or hydrogen atoms. The alkyl group is basically the same as the alkyl group bonded to the nitrogen atom of the pyridine ring, and it should preferably be a straight-chain alkyl group with 1 to 18 carbon atoms, which may have substituents, or a branched-chain or cyclic alkyl group. Particularly preferable is a straight-chain alkyl group with 4 to 18 carbon atoms. The alkyl group replacing a hydrogen atom may be the same as the alkyl group bonded to the nitrogen atom of the pyridine ring, or the former may be different from the latter. Examples of the alkyl-substituted pyridine may include α-picoline, β-picoline and γ-picoline that have one methyl group as the alkyl group; α-ethylpyridine, β-ethylpyridine and γ-ethylpyridine that have one ethyl group as the alkyl group; and 2,3-lutidine, 2,4-lutidine, 2,6-lutidine and 3,4-lutidine that have two methyl groups as the alkyl groups. Among them the pyridines and γ-picoline are preferable.

There is no special limitation on anions included in the pyridinium ionic liquids. Examples of the anions may include halogen ions, $BF_4^-$, $PF_6^-$, $CF_3SO_3^-$ (trifluoromethanesulfonyl ion), and $(CF_3SO_2)_2N^-$ (bis(trifluoromethanesulfonyl) imide ion, which is often abbreviated to TFSI). Among them, preferable are $BF_4^-$, $PF_6^-$, $CF_3SO_3^-$ and $(CF_3SO_2)_2N^-$, which are organic acid ions, with $(CF_3SO_2)_2N^-$ particularly preferable.

Examples of the pyridinium ionic liquids, which have pyridinium ions not substituted with the alkyl group as cations, and bis(trifluoromethanesulfonyl)imide ions as anions, may include N-propylpyridinium bis(trifluoromethanesulfonyl)imide, N-butylpyridinium bis(trifluoromethanesulfonyl)imide, N-pentylpyridinium bis(trifluoromethanesulfonyl)imide, N-hexylpyridinium bis(trifluoromethanesulfonyl)imide, N-heptylpyridinium bis(trifluoromethanesulfonyl)imide, N-octylpyridinium bis(trifluoromethanesulfonyl)imide, N-nonylpyridinium bis(trifluoromethanesulfonyl)imide, N-decylpyridinium bis(trifluoromethanesulfonyl)imide, and N-allylpyridinium bis(trifluoromethanesulfonyl)imide.

Examples of the pyridinium ionic liquids, which have pyridinium ions substituted with the alkyl group as cations, and bis(trifluoromethanesulfonyl)imide ions as anions, may include N-propyl-2-methylpyridinium bis(trifluoromethanesulfonyl)imide, N-butyl-2-methylpyridinium bis(trifluoromethanesulfonyl)imide, N-pentyl-2-methylpyridinium bis(trifluoromethanesulfonyl)imide, N-hexyl-2-methylpyridinium bis(trifluoromethanesulfonyl)imide, N-heptyl-2-methylpyridinium bis(trifluoromethanesulfonyl)imide, N-octyl-2-methylpyridinium bis(trifluoromethanesulfonyl)imide, N-nonyl-2-methylpyridinium bis(trifluoromethanesulfonyl)imide, N-decyl-2-methylpyridinium bis(trifluoromethanesulfonyl)imide, N-propyl-3-methylpyridinium bis(trifluoromethanesulfonyl)imide, N-butyl-3-methylpyridinium bis(trifluoromethanesulfonyl)imide, N-pentyl-3-methylpyridinium bis(trifluoromethanesulfonyl)imide, N-hexyl-3-methylpyridinium bis(trifluoromethanesulfonyl)imide, N-heptyl-3-methylpyridinium bis(trifluoromethanesulfonyl)imide, N-octyl-3-methylpyridinium bis(trifluoromethanesulfonyl)imide, N-nonyl-3-methylpyridinium bis(trifluoromethanesulfonyl)imide, N-decyl-3-methylpyridinium bis(trifluoromethanesulfonyl)imide, N-propyl-4-methylpyridiniumbis(trifluoromethanesulfonyl)imide, N-butyl-4-methylpyridinium bis(trifluoromethanesulfonyl)imide, N-pentyl-4-methylpyridinium bis(trifluoromethanesulfonyl)imide, N-hexyl-4-methylpyridinium bis(trifluoromethanesulfonyl)imide, N-heptyl-4-methylpyridinium bis(trifluoromethanesulfonyl)imide, N-octyl-4-methylpyridinium bis(trifluoromethanesulfonyl)imide, N-nonyl-4-methylpyridinium bis(trifluoromethanesulfonyl)imide, and N-decyl-4-methylpyridinium bis(trifluoromethanesulfonyl)imide. Furthermore, examples of the pyridinium ionic liquids, which have pyridinium ions substituted with the alkyl group as cations, and hexafluorophosphate ions as anions, may include 1-octyl-4-methylpyridinium hexafluorophosphate, 1-nonyl-4-methylpyridinium hexafluorophosphate, and 1-octyl-4-methylpyridinium hexafluorophosphate.

The amine ionic liquids are liquids including ammonium ions, as cations, each ammonium ion formed from an aliphatic-type amine compound whose nitrogen atom is bonded with a substituent such as an alkyl group. The alkyl group is basically the same as that alkyl group which is bonded to the nitrogen atom in the pyridinium ionic liquids.

The aliphatic-type amine compound may include, for example, alicyclic amine compounds and aliphatic amine compounds. The ammonium ions formed from these amine compounds may include $R^1_4N^+$ ions, wherein four $R^1$'s may be the same or different from each other, each of $R^1$'s denotes a straight-chain, branched-chain or cyclic alkyl group with 1 to 18 carbon atoms, and more than one of $R^1$'s may form at least one ring.

Examples of the amine ionic liquids whose four alkyl groups $R^1$'s are the same may include N,N,N,N-tetrabutylammonium bis(trifluoromethanesulfonyl)imide, N,N,N,N-tetrapentylammonium bis(trifluoromethanesulfonyl)imide, N,N,N,N-tetrahexylammonium bis(trifluoromethanesulfonyl)imide, N,N,N,N-tetraheptylammonium bis(trifluoromethanesulfonyl)imide, N,N,N,N-tetraoctylammonium bis(trifluoromethanesulfonyl)imide, N,N,N,N-tetranonylammonium bis(trifluoromethanesulfonyl)imide, N,N,N,N-tetradecylammonium bis(trifluoromethanesulfonyl)imide, N,N,N,N-tetradodecylammonium bis(trifluoromethanesulfonyl)imide, N,N,N,N-tetrahexadecylammonium bis(trifluoromethanesulfonyl)imide, and N,N,N,N-tetraoctadecylammonium bis(trifluoromethanesulfonyl)imide.

Examples of the amine ionic liquids wherein three of the alkyl groups $R^1$'s are the same may include N,N,N-trimethyl-N-propylammonium bis(trifluoromethanesulfonyl)imide, N,N,N-trimethyl-N-butylammonium bis(trifluoromethanesulfonyl)imide, N,N,N-trimethyl-N-pentylammonium bis(trifluoromethanesulfonyl)imide, N,N,N-trimethyl-N-hexylammonium bis(trifluoromethanesulfonyl)imide, N,N,N-trimethyl-N-heptylammonium bis(trifluoromethanesulfonyl)imide, N,N,N-trimethyl-N-octylammonium bis(trifluoromethanesulfonyl)imide, N,N,N-trimethyl-N-nonylammonium bis(trifluoromethanesulfonyl)imide, and N,N,N-trimethyl-N-decylammonium bis(trifluoromethanesulfonyl)imide.

The second coating layer contains the ionic liquid in an amount from 1 to 20 parts by mass to 100 parts by mass of the urethane resin. When the ionic liquid content is within the range, the ionic liquid is capable of taking an effect on the performance of the developing roller. The image-forming device, with the developing roller 1 installed, is capable of effectively preventing the occurrence of fogging in low-humidity environments, maintaining a desired print density for a long time, and preventing the occurrence of density irregularity in halftone images, which satisfactorily contributes to the formation of high quality images. In order to largely contribute to the formation of high quality images, the ionic liquid content should preferably be from 4 to 19 parts by mass to 100 parts by mass of the urethane resin.

The second coating layer 4B contains an electric conductivity agent. Therefore the second coating layer 4B may also be called the second electrically conductive coating layer. There is no special limitation on the electric conductivity agent, as long as it is not an ionic liquid and it has electric conductivity. The electric conductivity agent is basically the same as that contained in the first coating layers 4A. The electric conductivity agent should be contained in an amount from 5 to 10 parts by mass to 100 parts by mass of the urethane resin, because the agent in an amount within the range enables the second coating layer 4B to show desired electric conductivity and to prevent the occurrence of fogging more effectively.

The second coating layer 4B contains particles of a filler. Although there is no special limitation on the filler, a silica filler may be employed. Examples of the silica filler may include filler of fumed silica or precipitated silica. Preferable examples may include surface-treated silica filler with high reinforcing capability, or filler of silica whose surface is treated with a silane-coupling agent represented by the general formula: $RSi(OR')_3$, wherein R denotes glycidyl, vinyl, aminopropyl, methacryloxy, N-phenylaminopropyl, or mercapto; and R' denotes methyl or ethyl. The silane-coupling agent represented by the general formula may be readily available as a commercial product, such as "KBM1003" and "KBE402" produced by Shin-Etsu Chemical Co., Ltd. The silica filler, the surface of which is treated with such a silane-coupling agent, may be provided by a treatment of the surface of the silica filler according to an established method. For the silica filler whose surface is treated with a silane-coupling agent may be employed a commercially available product such as "Zeothix 95" manufactured by J. M. Huber Corporation. Although there is no special limitation on the mean particle size of the filler particles, the mean particle size should be preferably from 1 to 80 μm for example, particularly preferably from 1 to 40 μm. The mean particle size of the silica filler may be measured as a mean weight diameter (or a median diameter), for example, with a particle size analyzer using a conventional method such as laser diffraction.

The filler particles should be contained in an amount preferably from 1 to 20 parts by mass to 100 parts by mass of the urethane resin, because the filler particles in an amount within the range makes it possible to keep essentially constant the amount of the toner physically transferred on the developing roller for a long time. The amount is especially preferably from 1 to 15 parts by mass.

The second coating layer 4B does not essentially contain particles of the fluororesin that are contained in the first coating layers 4A. The requirement "particles of a fluororesin are not essentially contained" of this invention means that the second coating layer 4B does not intentionally contain particles of a fluororesin, and it covers a situation where the second coating layer contains particles of a fluororesin in such an amount that the particles do not show their properties, as well as a situation where the second coating layer contains no fluororesin particles. A possible case of the situation where the second coating layer contains fluororesin particles in such an amount that the particles do not show their properties is, for example, that fluororesin particles contained in the first coating layers 4A permeate into the second coating layer 4B and remain in the layer. The amount of the fluororesin particles that does not allow the particles to exhibit their properties may be, for example, not more than 0.1 part by mass to 100 parts by mass of the urethane resin.

The second coating layer 4B should have a thickness normally from 0.1 to 50 μm, more desirably from 10 to 25 μm. The thickness of the second coating layer 4B may be either thicker or thinner than, or the same as that of the first coating layers 4A. The developing roller 1, an example of the present invention, has the second coating layer 4B whose thickness is larger than the thickness of the first coating layers 4A.

When the second coating layer 4B contains the urethane resin, at least one ionic liquid selected from the group consisting of pyridinium ionic liquids and amine ionic liquids, the electric conductivity agent, and the filler particles, wherein fluororesin particles are not essentially included in the second coating layer, the second coating layer 4B is capable of carrying a toner in a desired manner on the outer circumferential face thereof, and adjusting the amount of the electric charge of the carried toner. Therefore, as explained hereinbefore, the developing roller 1 with the second coating layer 4B is capable of supplying a predetermined amount of a toner with a predetermined electric charge to the image carrier. As a result, the developing roller 1, once installed in the development apparatus or image-forming device, contributes to the formation of high quality images.

The coating layer 4 just requires that it have the first coating layers 4A formed on the outer circumferential face of the elastic layer 3 at both edges across the elastic layer, and the second coating layer 4B formed between these first coating layers 4A. The first coating layers 4A and the second coating layer 4B may be formed so that they adjoin each other and they are not overlapped. Alternatively, they are formed so that part of either the first coating layers or the second coating layer is superimposed on the outer circumferential face of the other layer or layers. For example, the coating layer of the present invention may have a second coating layer that covers the entire outer circumferential face of the elastic layer 3, and first coating layers arranged on the outer circumferential face of the second coating layer at the respective edges thereof. The toner-sealing member 25 of the present invention is made of an elastic material at the part that contacts the developing roller 1, which will be explained hereinafter. Thus a step between the first coating layer and the second coating layer, the step formed when one of the first and second coating layers is superimposed on the other, is effectively absorbed.

When the first coating layers 4A and the second coating layer 4B are so formed as to overlap with each other, which should be formed on the lower side is decided, depending on the adhesiveness between the layer 4A and the layer 4B and the adhesiveness between the elastic member 3 and each of the layers 4A and the layer 4B.

The developing roller 1 is produced by forming an elastic layer 3 on the outer circumferential face of a shaft 2, and then forming a coating layer 4 on the outer circumferential surface of the elastic layer 3. As a first step of producing the developing roller 1, a shaft 2 is prepared. The shaft 2 is formed into a desired shape by, for example, known methods. A primer may be applied to the shaft 2 before the formation of the elastic layer 3. There is no special limitation on the primer to be applied to the shaft 2. Examples of the primer may include the same resins and crosslinking agents as those used to form a primer layer with the aid of which the elastic layer 3 and the coating layer 4 contact or adhere to each other, which primer layer will be described hereinafter. The primer may be dissolved in a medium such as a solvent if desired, and may be applied to the outer circumferential face of the shaft by the usual method, such as dipping or spraying.

The elastic layer 3 is formed, by heating an electrically conductive composition that has been applied onto the outer circumferential face of the shaft 2 to cure the composition on the face. The electrically conductive composition contains rubber, an electric conductivity agent, and optionally various additives. Examples of the rubber may include silicone or modified silicone rubber, nitrile rubber, ethylene propylene rubber including ethylene propylene diene rubber, styrene butadiene rubber, butadiene rubber, isoprene rubber, natural rubber, acrylic rubber, chloroprene rubber, butyl rubber, epichlorohydrin rubber, urethane rubber, and fluororubber. The rubber should preferably be made of silicone or modified silicone rubber, or urethane rubber, among them. Especially preferable are silicone rubber and modified silicone rubber, because they are excellent in heat resistance and charging characteristics. These rubbers may be liquid ones or milable ones. There is no special limitation on the electric conductivity agent, as long as it has electric conductivity. Examples of the agent may include electrically conductive powder of electrically conductive materials such as electrically conductive carbon, carbons for rubber, metal and electrically conductive polymer. The various additives may include, for example, auxiliaries such as chain extenders and crosslinking agents, catalysts, dispersants, foaming agents, age resistors, antioxidants, fillers, pigments, colorants, processing agents, softeners, plasticizers, emulsifiers, heat-resistance improvers, flame-retardant enhancers, acid acceptors, thermal conductivity improvers, mold release agents, solvents and the like. Preferable examples of the electrically conductive composition may be addition-cure milable electrically conductive silicone rubber compositions and addition-cure liquid electrically conductive silicone rubber compositions.

The addition-cure milable electrically conductive silicone rubber compositions include (A) an organopolysiloxane represented by average composition formula (1) shown below, (B) a filler, and (C) an electrically conductive material other than those belonging to component (B).

$$R_nSiO_{(4-n)/2} \quad (1)$$

In this formula, R's, which may be the same or different from each other, each denote a substituted or unsubstituted hydrocarbyl group, preferably a substituted or unsubstituted hydrocarbyl group with 1-12 carbon atoms, more preferably a substituted or unsubstituted hydrocarbyl group with 1-8 carbon atoms; and n is a positive number from 1.95 to 2.05.

Examples of the substituent R may include an alkyl group such as methyl, ethyl, propyl, butyl, hexyl and dodecyl; a cycloalkyl group such as cyclohexyl; an alkenyl group such as vinyl, allyl, butenyl and hexenyl; an aryl group such as phenyl and tolyl; an aralkyl group such as β-phenylpropyl; and groups made by replacing all or part of the hydrogen atoms bonding to the carbon atoms of the above-mentioned groups with a halogen atom or cyano group, such as chloromethyl group, trifluoropropyl group and cyanoethyl group.

Component (A), the organopolysiloxane, has the ends of the molecular chain blocked with suitable groups such as trimethylsilyl, dimethylvinyl, dimethylhydroxysilyl or trivinylsilyl. This organopolysiloxane should preferably have at least two alkenyl groups, which we mentioned herein before, within its molecule. Specifically, from 0.001 to 5% by mole of the R's, preferably from 0.01 to 5% by mole thereof should be alkenyl groups, especially vinyl groups. Especially when a combination of a platinum catalyst and an organohydrogenpolysiloxane is used as a curing agent, which will be explained hereinafter, an organopolysiloxane with these alkenyl groups is usually employed.

Also, component (A), the organopolysiloxane, may be provided, normally, by co-hydrolysis and co-condensation of one or more of selected organohalosilanes, or ring-opening polymerization of a cyclic polysiloxane, such as a trimer or tetramer of a siloxane in the presence of an alkaline or acidic catalyst. Component (A), the organopolysiloxane, is basically a straight-chain diorganopolysiloxane. However, part of the chain may be branched. Alternatively, it may be a mixture of two or more organopolysiloxanes with different molecular structures. This component, the organopolysiloxane, normally has a viscosity of not less than 100 cSt at 25° C., preferably from 10,000 to 10,000,000 cSt. Also, component (A), the organopolysiloxane, normally has a degree of polymerization of not less than 100, preferably not less than 3,000, with an upper limit of preferably 100,000, particularly preferably 10,000.

Although there is no special limitation on component (B), the filler, a silica filler may be employed. Examples of the silica filler may include filler of fumed silica or precipitated silica. Preferable examples may include surface-treated silica filler with high reinforcing capability, or filler of silica whose surface is treated with a silane-coupling agent represented by the general formula: $RSi(OR')_3$, wherein R denotes glycidyl, vinyl, aminopropyl, methacryloxy, N-phenylaminopropyl, or mercapto; and R' denotes methyl or ethyl. The silane-coupling agent represented by the general formula may be readily available as a commercial product, such as "KBM1003" and "KBE402" produced by Shin-Etsu Chemical Co., Ltd. The silica filler, the surface of which is treated with such a silane-coupling agent, may be provided by a treatment of the surface of the silica filler according to an established method. For the silica filler whose surface is treated with a silane-coupling agent may be employed a commercially available product such as "Zeothix 95" manufactured by J. M. Huber Corporation. The silica filler content should be preferably from 11 to 39 parts by mass, especially preferably from 15 to 35 parts by mass, to 100 parts by mass of component (A), the organopolysiloxane. The silica filler should have a mean particle size of preferably from 1 to 80 μm, particularly preferably from 2 to 40 μm. The mean particle size of the silica filler may be measured as a mean weight diameter (or a median diameter), for example, with a particle size analyzer using a conventional method such as laser diffraction.

Component (C), or the electrically conductive material, is a material that does not belong to the filler (B). Materials, which are different in their form and state from the silica filler defined as filler (B) even if the materials are physically and chemically the same as the silica filler, belong to the electrically conductive material (C). The electrically conductive material is an electric conductivity-imparting component, an example of which may be the electric conductivity-imparting agent described hereinbefore. Among the examples of the agent, preferable is carbon black. The electrically conductive material may be used alone, or two or more of the examples thereof may be used in combination.

The addition-cure milable electrically conductive silicone rubber composition may include additives in such an amount that they do not hinder the achievement of the objective of the present invention. The additives may include, for example, curing agents; colorants; heat-resistance improvers such as iron octoate, iron oxide and cerium oxide; acid acceptors; thermal conductivity improvers; mold release agents; alkoxysilane; dimethylsiloxane oil whose degree of polymerization is smaller than that of the organopolysiloxane (A); silanols such as silanediol; dispersants such as low-molecular-weight siloxanes, both ends of which are blocked with silanol groups, an example of which is α,ω-dimethyl-siloxanediol, and silanes; various carbon-functional silanes to improve adhesiveness, and formability and workability; and various cured and uncured olefin elastomers that do not impede crosslinking reactions.

The addition-cure liquid electrically conductive silicone rubber composition includes (D) an organopolysiloxane with at least two alkenyl groups bonded to silicon atoms in one molecule; (E) an organohydrogenpolysiloxane with at least two hydrogen atoms bonded to silicon atoms in one molecule; (F) an inorganic filler with a mean particle size of 1 to 30 µm and a bulk density of 0.1 to 0.5 g/cm³; (G) an electric conductivity-imparting agent; and (H) a catalyst for addition reaction.

For component (D), the organopolysiloxane, suitable are compounds represented by average composition formula (2) shown below.

$$R^1_a SiO_{(4-a)/2} \quad (2)$$

In this formula, $R^1$'s, which may be the same or different from each other, each denote a substituted or unsubstituted hydrocarbyl group with 1-10 carbon atoms, preferably a substituted or unsubstituted hydrocarbyl group with 1-8 carbon atoms; and $\underline{a}$ is a positive number from 1.5 to 2.8, preferably from 1.8 to 2.5, more preferably from 1.95 to 2.02.

Examples of the substituent $R^1$ may include an alkyl group, an aryl group, an aralkyl group, an alkenyl group; and groups made by replacing all or part of the hydrogen atoms bonding to the carbon atoms of the above-mentioned groups with a halogen atom or cyano group, as exemplified for R of the organopolysiloxane included in the addition-cure milable electrically conductive silicone rubber composition. It will be preferable if at least two of $R^1$'s included in the entire organopolysiloxane (D) represented by formula are alkenyl groups, especially vinyl groups, and not less than 90% thereof are methyl groups. Specifically, the alkenyl group content of the organopolysiloxane should preferably be from $1.0 \times 10^{-6}$ to $5.0 \times 10^{-3}$ mol/g, especially from $5.0 \times 10^{-6}$ to $1.0 \times 10^{-3}$ mol/g.

Component (D), the organopolysiloxane, should have such a degree of polymerization that the organopolysiloxane is in a liquid form at room temperature, or 25° C. Alternatively, the viscosity of the organopolysiloxane should be from 100 to 1,000,000 mPa·s, preferably about from 200 to 100,000 mPa·s at 25° C. The organopolysiloxane should have an average degree of polymerization of preferably from 100 to 800, particularly preferably from 150 to 600.

Composition (E), the organohydrogenpolysiloxane, is represented by average composition formula (3) shown below, wherein the organohydrogenpolysiloxane has at least two, preferably not less than three (normally from 3 to 200), more preferably from 3 to 100 hydrogen atoms per molecule, the hydrogen atoms bonded to silicon atoms.

$$R^2_b HcSiO_{(4-b-c)/2} \quad (3)$$

In this formula, $R^2$'s, which may be the same or different from each other, each denote a substituted or unsubstituted hydrocarbyl group with 1-10 carbon atoms; and $\underline{b}$ is a positive number from 0.7 to 2.1, c is a positive number from 0.001 to 1.0, and b+c is in the range of 0.8 to 3.0.

The amount of the hydrogen atoms bonded to the silicon atoms (Si—H) in the organohydrogenpolysiloxane should preferably be from 0.001 to 0.017 mol/g, particularly from 0.002 to 0.015 mol/g.

This organohydrogenpolysiloxane (E) may include a methylhydroxypolysiloxane both ends of which are blocked with trimethylsiloxy groups, a dimethylsiloxane-methylhydrogensiloxane copolymer both ends of which are blocked with trimethylsiloxy groups, a dimethylpolysiloxane both ends of which are blocked with dimethylhydrogensiloxy groups, a dimethylsiloxane-methylhydrogensiloxane copolymer both ends of which are blocked with dimethylhydrogensiloxy groups, a methylhydrogensiloxane-diphenylsiloxane copolymer both ends of which are blocked with trimethylsiloxy groups, a methylhydrogensiloxane-diphenylsiloxane-dimethylsiloxane copolymer both ends of which are blocked with trimethylsiloxy groups, a copolymer composed of $(CH_3)_2HSiO_{1/2}$ repeat units and $SiO_{4/2}$ repeat units, and a copolymer composed of $(CH_3)_2HSiO_{1/2}$ repeat units, $SiO_{4/2}$ repeat units and $(C_6H_5)SiO_{3/2}$ repeat units.

The amount of the organohydrogenpolysiloxane (E) should be preferably from 0.1 to 30 parts by mass, particularly preferably from 0.3 to 20 parts by mass, to 100 parts by mass of the organopolysiloxane (D). Also, the ratio of the moles of the hydrogen atoms bonded with the silicone atoms in the organopolysiloxane (D) to the moles of the alkenyl groups therein should be preferably from 0.3 to 5.0, particularly preferably from 0.5 to 2.5.

Component (F), the inorganic filler, is an important component to provide a roller with low compression set, stable volume resistivity with lapse of time and sufficient durability. The inorganic filler has a mean particle size from 1 to 30 µm, preferably from 2 to 20 µm, and a bulk density from 0.1 to 0.5 g/cm³, preferably from 0.15 to 0.45 g/cm³. When the mean particle size is smaller than 1 µm, the electrical resistivity may vary with lapse of time; when the mean particle size is larger than the durability of the elastic layer 3 may be lowered. Also, a bulk density of smaller than 0.1 g/cm³ may cause the compression set to deteriorate and the electrical resistivity to vary with time, while a bulk density of larger than 0.5 µm may provide the elastic layer 3 with insufficient strength, which leads to deterioration in the durability. The mean particle size may be measured as a mean weight diameter (or a median diameter), for example, with a particle size analyzer using a conventional method such as laser diffraction. The bulk density may be calculated based on the method of determining apparent specific gravity in accordance with JIS K 6223.

Examples of the inorganic filler (F) may include diatomaceous earth, perlite, mica, calcium carbonate, glass flakes, and hollow fillers. Among them, ground products of diatomaceous earth, perlite and expanded perlite are preferable.

The amount of the inorganic filler (F) should be preferably from 5 to 100 parts by mass, particularly preferably from 10 to 80 parts by mass, to 100 parts by mass of the organopolysiloxane (D).

Component (G), the electric conductivity-imparting agent, is the same as the one which was explained hereinbefore. The amount of the agent should be from 2 to 80 parts by mass to 100 parts by mass of the organopolysiloxane (D).

Examples of the catalyst for addition reaction (H) may include platinum black, platinum (IV) chloride, chloroplatinic acid, a reaction product of chloroplatinic acid and a monohydric alcohol, a chloroplatinic acid-olefin complex, platinum bis-acetoacetate, palladium catalysts and rhodium catalysts. A very small amount of the catalyst would be sufficient for addition reaction (H). The platinum group metal content should be preferably from 0.5 to 1,000 ppm to the total of the mass of the organopolysiloxane (D) and that of the organohydrogenpolysiloxane. It should be particularly preferable, if the content is approximately from 1 to 500 ppm.

The addition-cure liquid electrically conductive silicone rubber composition may include, in addition to the components explained hereinbefore, an ester of a low molecular weight siloxane; a dispersant such as silanol, a particular example of which is diphenylsilandiol; a heat-resistance improver such as iron octoate, iron oxide and cerium oxide; various carbon-functional silanes to improve adhesiveness, and formability and workability; and a halogen compound imparting incombustibility, in such an amount that they do not hamper the achievement of the objective of the present invention.

The addition-cure liquid electrically conductive silicone rubber composition should have a viscosity from 5 to 500 Pa·s, especially from 5 to 200 Pa·s at 25° C.

For example, the heating and curing of the electrically conductive composition as explained hereinbefore and the forming the elastic layer 3 on the outer circumferential face of the shaft 2 are carried out simultaneously or in succession by known methods. The curing of the electrically conductive composition may be done by any method that is capable of providing the composition with heat necessary to cure it. The forming of the elastic layer 3 may also be done by any suitable method, such as continuous vulcanization through extrusion molding, press, or die forming through injection. For example, when the electrically conductive composition is an addition-cure milable electrically conductive silicone rubber composition, extrusion molding or similar methods may be selected. On the other hand, when the electrically conductive composition is an addition-cure liquid electrically conductive silicone rubber composition, for example, molding using a die may be selected. The temperature and time period for the heating employed to cure the electrically conductive composition varies depending on the composition. Specifically, when the composition is an addition-cure milable electrically conductive silicone rubber composition, the temperature is preferably from 100 to 500° C., particularly from 120 to 300° C., and the time period is preferably from several seconds to not more than one hour, particularly from 10 seconds to 35 minutes. When the composition is an addition-cure liquid electrically conductive silicone rubber composition, the temperature is preferably from 100 to 300° C., particularly from 110 to 200° C., and the time period is preferably from 5 minutes to 5 hours, particularly from 1 hour to 3 hours. As the need arises, a secondary vulcanization may be carried out, under the conditions that the temperature is from 100 to 200° C. and the time period is approximately from 1 to 20 hours for an addition-cure milable electrically conductive silicone rubber composition, and under the conditions that the temperature is from 120 to 250° C. and the time period is approximately from 2 to 70 hours for an addition-cure liquid electrically conductive silicone rubber composition. A sponge-like elastic layer containing air bubbles may also be produced from the electrically conductive composition easily by known expansion and cure methods.

The surface of the elastic layer 3 thus formed may be ground and polished, if it is desired, so that the outer diameter of a cylinder consisting of the shaft and the elastic layer 3 and the conditions of the surface the elastic layer will be adjusted. Before the formation of the coating layer 4, the primer layer may be formed on the elastic layer 3.

The coating layer 4 is formed by applying a first resin composition capable of forming the first coating layers 4A and a second resin composition capable of forming the second coating layer 4B onto the outer circumferential surface of the elastic layer 3 or a primer layer, which has been formed on the elastic layer in some cases where it is desirable, and then heating and curing the applied first and second resin compositions. When the first coating layers 4A and the second coating layer 4B are formed so that they adjoin each other and they are not overlapped, one of the first regions on the outer circumferential face of the elastic member 3 for forming the first coating layers and the second region thereon for forming the second coating layer are or is masked, the second resin composition or the first resin composition is applied to the other region or regions, or the not masked region or regions, and the applied resin composition is cured. Then, the first or second resin composition for forming the other coating layer or layers is applied to the region or regions that have been masked, and then is cured. Thus, the first coating layers 4A and the second coating layer 4B that adjoin each other may be formed on the outer circumferential face of the elastic layer 3. When the first coating layers and the second coating layer are formed so that either the first coating layers or the second coating layer is superimposed on the outer circumferential face of the other layer, one of the second resin composition and the first resin composition, for respectively forming the second coating layer and the first coating layers, is applied to the outer circumferential face of the elastic layer 3 and cured, which is followed by the step of applying the other resin composition onto the corresponding region or regions on which the second coating layer or the first coating layers are formed, and the step of curing the applied resin. Thus the coating layer 4 may be formed on the outer circumferential face of the elastic layer 3.

In more detail, the first resin composition capable of forming the first coating layers 4A and the second resin composition capable of forming the second coating layer 4B are prepared. The first resin composition is a resin composition containing a polyol and a silane-coupling agent, the precursors to form the resin, fluororesin particles, an electric conductivity agent, and optionally various additives such as fillers, wherein the composition does not essentially contain ionic liquid. Therefore, the first coating layers 4A are formed by applying the first resin composition that contains the polyol and the silane-coupling agent, the fluororesin particles, the electric conductivity agent, and optionally various additives to the outer circumferential face of the elastic layer 3 and curing the composition on it. The respective amounts of the polyol and silane-coupling agent, the fluororesin particles, and the electric conductivity agent are basically the same as those of the corresponding components contained in the first coating layers 4A. The amount of the various additives may be adjusted suitably. The polyol, the silane-coupling agent, the fluororesin particles, and the electric conductivity agent contained in the first resin composition are the same as those that have been explained hereinbefore. The requirement "ionic, liquid is not essentially contained" of this invention means that the first resin composition does not intentionally contain ionic liquid, and it covers a situation where the first resin composition contains ionic liquid in such an amount that the ionic liquid does not show its properties, as well as a situation where the first resin composition contains no ionic liquid. The amount of the ionic liquid that does not allow the liquid to exhibit its properties has been specified hereinbefore.

The second resin composition is a urethane resin composition containing urethane-producing components, the precursors to produce the urethane resin, the ionic liquid, the electric conductivity agent, filler particles, and various additives if desired, wherein fluororesin particles are not essentially contained. The second resin composition, which contains the urethane-producing components, the ionic liquid, the electric conductivity agent, the filler particles, and various additives if desired, is applied to the outer circumferential face of the elastic layer 3 and then cured. The second coating layer 4B is thus formed. The respective amounts of the urethane-producing components, the ionic liquid, the electric conductivity agent, and the filler particles are basically the same as those of the corresponding components contained in the second coating layers 4B. The amount of the various additives may be adjusted suitably. The urethane-producing components, the ionic liquid, the electric conductivity agent, and the filler particles contained in the second resin composition are the same as those that have been explained hereinbefore. The requirement "fluororesin particles are not essentially contained" of this invention means that the second resin composition does not intentionally contain fluororesin particles, and it covers a situation where the second resin composition contains fluororesin particles in such an amount that the fluororesin particles do not show their properties, as well as a situation where the second resin composition contains no fluororesin particles. The amount of the fluororesin particles that does not allow the particles to exhibit their properties has been specified hereinbefore.

Components capable of producing known polyurethane would suffice for the urethane-producing components contained in the second resin composition, and examples of the components may include a mixture of a polyol and a polyisocyanate.

The polyol includes various polyols that are usually used for the production of polyurethane. The polyol should preferably be at least one selected from polyether polyols and polyester polyols. Examples of the polyether polyols may include polyalkylene glycols such as polyethylene glycol, polypropylene glycol and polypropylene glycol-ethylene glycol; polytetramethylene ether glycol; copolymer polyols of tetrahydrofuran and an alkyleneoxide; and various modified compounds and mixtures thereof. Examples of the polyester polyols may include condensed polyester polyols provided by condensation of a dicarboxylic acid, such as adipic acid, and a polyol, such as ethylene glycol and hexanediol; lactone polyester polyols; polycarbonatepolyols; and mixtures thereof. The polyether polyols and polyester polyols may be used singly or in combination. Also, combinations of a polyether polyol and a polyester polyol may be employed. The polyol should preferably be a polyester polyol because it is excellent in thermal stability. The polyol should have preferably a number average molecular weight from not less than 1400 to less than 2000. The number average molecular weight is a molecular weight by gel permeation chromatography (GPC), converted to polystyrene standard.

Various isocyanates that are usually used for the production of polyurethane would suffice for the isocyanate. It may include, for example, aliphatic isocyanates, aryl isocyanates and derivatives thereof. The isocyanate should preferably be an aryl isocyanate, because the aryl isocyanate is excellent in storage stability and the rate of the reaction between the polyisocyanate and the polyol is capable of being controlled easily. Examples of the aryl isocyanate may include xylylene diisocyanate (XDI), diphenylmethane diisocyanate (MDI), toluene diisocyanate, which is also called tolylene diisocyanate (TDI), 3,3'-bitolylene-4,4'-diisocyanate, 3,3'-dimethyldiphenylmethane-4,4'-diisocyanate, 2,4-tolylene diisocyanate uretidinedione (a dimer of 2,4-TDI), xylene diisocyanate, naphthalene diisocyanate (NDI), p-phenylenediisocyanate (PDI), tolidinediisocyanate (TODI), and m-phenylene diisocyanate. Examples of the aliphatic isocyanate may include hexamethylene diisocyanate (HDI), 4,4'-dicyclohexylmethane diisocyanate (hydrogenated MDI), o-toluidine diisocyanate, lysine diisocyanate methyl ester, isophoronediisocyanate (IPDI), norbornane diisocyanate methyl, trans-cyclohexane-1,4-diisocyanate, and triphenylmethane-4,4', 4''-triisocyanate. The derivatives may include multimers of the polyisocyanate, polyisocyanates reacted with e.g. a small amount of a polyol, including urethane prepolymers, dimers resulting from the formation of uretidione, isocyanurates, carbodimides, uretonimine, allophanate, urea, and biuret. The polyisocyanates may be used singly or in combination. The polyisocyanate should have a molecular weight of preferably from 500 to 2000, more preferably from 700 to 1500.

There is no special limitation on the mixing proportion in a mixture of the polyol and polyisocyanate. Normally, the molar ratio (NCO/OH) of isocyanate groups (NCO) included in the polyisocyanate to hydroxyl groups (OH) included in the polyol should be from 0.7 to 1.15. This molar ratio (NCO/OH) should preferably be from 0.85 to 1.1, because the molar ratio within this range leads to the prevention of hydrolysis of polyurethane. In actual production, however, the amount of polyisocyanate may be from three to four times as large as the amount that falls within the proper molar ratio, in view of working environment and errors during the operation.

The urethane-producing components may include, in addition to the polyol and polyisocyanate, auxiliaries that are usually used in the reaction between a polyol and a polyisocyanate, such as chain extenders and crosslinking agents. Examples of the chain extenders and crosslinking agents may include glycols, hexanetriol, trimethylolpropane and amines.

The application of the first resin composition and the second resin composition, which may be hereinafter called the resin compositions together, may be carried out by known methods, examples of which may include coating in which the surface is coated with a coating liquid of each resin composition, dipping in which the roller under production with the elastic layer 3 is immersed in the coating liquid of each resin composition, and spray coating in which each coating liquid is sprayed onto the elastic layer 3. The resin compositions may be applied as they are. Instead of undiluted resin compositions may be employed coating liquids each containing each resin composition, and volatile solvents whose examples may include alcohols such as methanol and ethanol, aromatic solvents such as xylene and toluene, ester solvents such as ethyl acetate and butyl acetate, or water.

The curing of the first resin composition thus applied may be carried out by various methods, which may include curing by hot air, by induction heating, and by microwaves. The conditions of the curing are such that the temperature employed for heating and curing the first resin composition is, for example, from 100 to 180° C., particularly from 120 to 160° C., and the time period therefor is preferably from 10 to 90 minutes, particularly from 30 to 60 minutes. The temperature employed for heating and curing the applied second resin composition is, for example, from 120 to 160° C., particularly from 130 to 160° C., and the time period therefor is preferably from 20 to 60 minutes, particularly from 30 to 60 minutes.

The coating layer having the first coating layers 4A and the second coating layer 4B is thus formed on the outer circumferential face of the elastic layer 3, whereby the developing roller 1 is produced.

The developing roller 1 thus produced, which is provided with the coating layer 4 having the first coating layers 4A and the second coating layer 4B on the outer circumferential face of the elastic member 3, is capable of effectively preventing toner leaks in high-humidity environments as well as in normal-humidity environment, such as an environment of about 50% relative humidity, and of essentially preventing the production of defective images, such as images with fogging, which results in deterioration of the image quality, in low-humidity environments as well as in normal humidity environments, once the developing roller 1 is installed in the development apparatus. The developing roller is also capable of maintaining a desired print density for a long time, and of preventing the occurrence of density irregularity in halftone images. Thus the developing roller largely contributes to the formation of high quality images. Therefore this developing roller is capable of keeping the image quality high yet arresting toner leaks satisfactorily, which are incompatible properties or performances of the image-forming device.

Thus the developing roller 1 is capable of essentially arresting toner leaks even when it is in a high-humidity environment, whereas it is capable of essentially preventing the occurrence of fogging even when it is in a low-humidity environment. Therefore the developing roller may be particularly suitably applied to, for example, today's high-definition image-forming devices and developing rollers of development apparatuses that are mounted in those image-forming devices.

Figure 3:
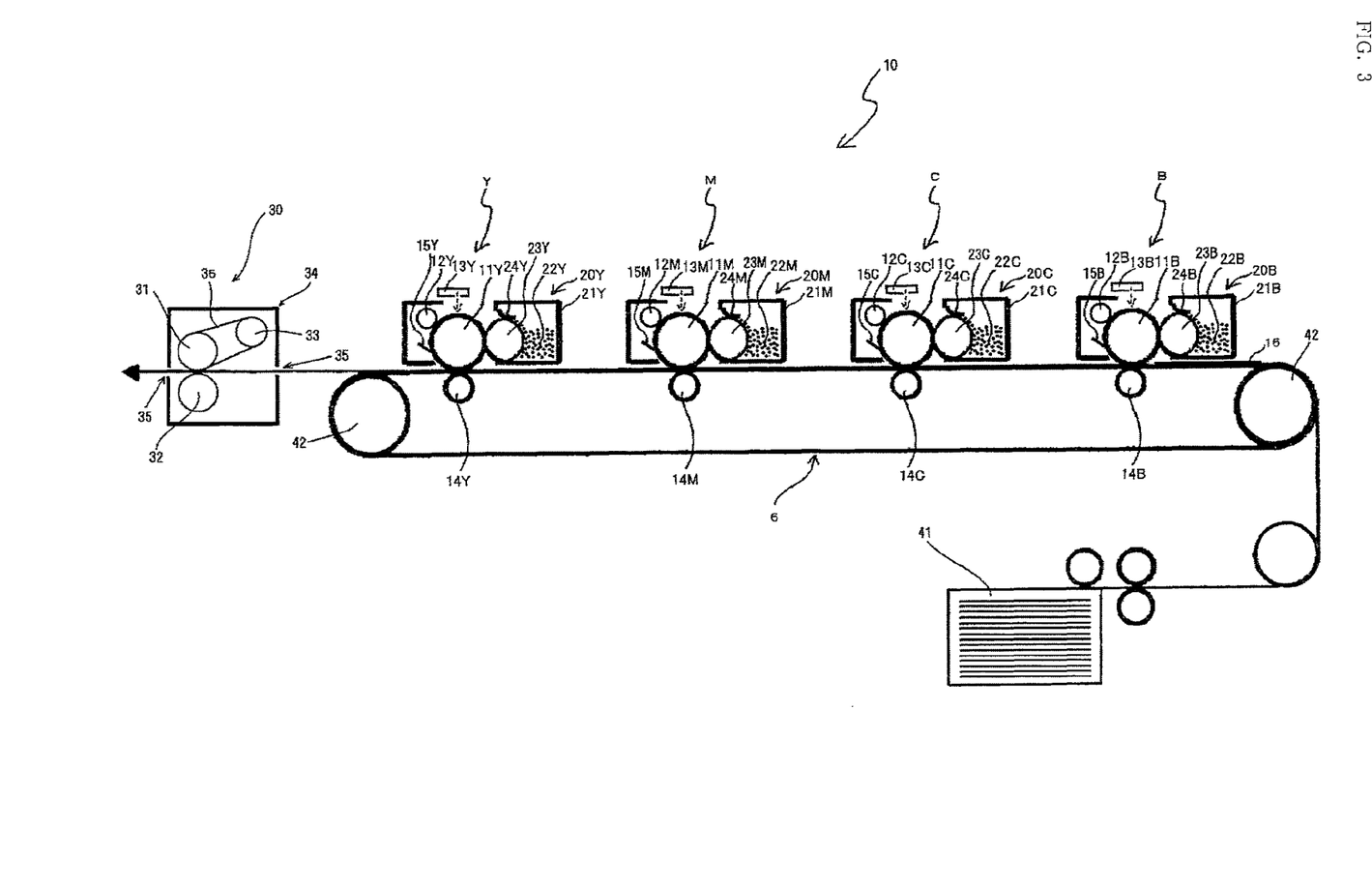
FIG. 3 is a schematic diagram showing an example of the image-forming device according to the present invention.

In the following, an example of the development apparatus equipped with the developing roller 1 according to the present invention, which development apparatus may be called the development apparatus or toner cartridge according to the present invention hereinafter, and the image-forming device, which may be called the image-forming device according to the present invention hereafter, will be explained, with reference to FIG. 3. As shown in FIG. 3, this image-forming device 10 is a tandem color image-forming device which has developing units B, C, M and Y, each for a color, respectively provided with image carriers 11B, 11C, 11M and 11Y, wherein the image carriers are arranged in series on a transfer and conveyor belt 6. In other words, the developing units B, C, M and Y are arranged in series on the belt 6. The developing unit B has an image carrier 11B, such as a photoreceptor, which is also called photoconductor drum; a static charger 12B, such as a charge roller; an exposing device 13B; a development apparatus 20B; a transfer device 14B, such as a transfer roller; and a cleaner 15B.

The development apparatus 20B is an example of the development apparatus according to the present invention. The apparatus has, as shown in FIG. 3, a toner carrier 23B as a developing roller of the present invention, a toner 22B such as a positively charged toner, and toner-sealing members 25 (not shown in FIG. 3), contacting both edges of the toner carrier 23B, for preventing toner leaks. The developing rollers 1 are installed in the image-forming device 10 as toner carriers 23B, 23C, 23M, and 23Y. In more detail, the development apparatus 20B is a development apparatus or a toner cartridge, equipped with a housing 21B for containing a nonmagnetic monocomponent toner 22B, and a toner carrier 23B for supplying the toner 22B to the image carrier 11B, such as a developing roller; a toner-amount adjuster 24B for adjusting a thickness of the toner 22B on the surface of the toner carrier, such as a blade; and the toner-sealing members 25 (not shown in FIG. 3), contacting both edges of the toner carrier 23B, for preventing toner leaks. How the toner carrier 23B, the toner-amount adjuster 24B, and the toner-sealing members 25 contact each other is essentially the same as how the developing roller 1, the toner-controlling member 24, and the toner-sealing members 25 shown in FIG. 2 contact each other; the toner-amount adjuster 24B contacts or presses on the outer circumferential face of the toner carrier 23B. As understood, the development apparatus 20B is a so-called contact-type development apparatus. The developing units C, M and Y are essentially the same as the developing unit B.

Known toner-sealing members with a curved sliding face that contacts the outer circumferential face of the developing roller 1, as shown in FIG. 2, would suffice for the toner-sealing members 25 that the development apparatus 20B has. For example, an "edge-sealing member 21" disclosed in patent document 2 may be employed. At least the curved sliding face of the toner-sealing member 25 is made of an elastic member, such as felt. The toner-sealing member 25 is fitted or fixed to the development apparatus in such a manner that the curved sliding face contacts or presses on the outer circumferential portion of each first coating layer 4A of the developing roller 1. Specifically, as shown in FIG. 2, the developing roller 1 is installed in the development apparatus 20 so that the edge-side portion of the outer circumferential face of each first coating layer 4A contacts the curved sliding face of the toner-sealing member 25, the center-side portion of each first coating layer 4A and the second coating layer 4B contact the toner-controlling member 24 with which the toner-sealing member 25 is provided. The toner-sealing member 25 thus has the curved sliding face with a diameter essentially the same as the diameter of each first coating layer 4A. The toner-sealing member 25 is fixed to the housing of the development apparatus 20 at a rear end portion, which is not shown in the figures. For the toner-sealing member 25 may be employed a "toner-sealing structure" disclosed in the JP 2007-140139 A publication or a "side-sealing member" disclosed in the JP 2009-265574 A publication, as well as the "edge-sealing member 21" disclosed in patent document 2.

The toner carrier 23B of the development apparatus 20B is arranged in the image-forming device 10 so that the surface of the toner carrier contacts or presses on the surface of the image carrier 11B. The toner carriers 23C, 23M, and 23Y of the respective development apparatuses 20C, 20M, and 20Y are arranged in the same way, or so that the surface of the toner carriers contacts or presses on the surface of the corresponding image carriers 11C, 11M, and 11Y.

A fixing device 30 is arranged downstream of the developing unit Y. The fixing device has a housing with an opening 35 through which a recording material 16 passes. The fixing device also accommodates, in the housing, a fixing roller 31; an endless belt-supporting roller 33 placed in the proximity of the fixing roller 31; an endless belt 36 wound on the fixing roller 31 and the endless belt-supporting roller 33; and a pressure roller 32 so disposed as to face the fixing roller 31, wherein the fixing roller 31 and the pressure roller 32 are arranged so that they contact or press each other with the endless belt 36 in between and they are free to rotate. A cassette 41 for containing the recording material 16 is placed on the bottom of the image-forming device 10. The transfer and conveyor belt 6 is wound on several supporting rollers 42.

Each of the toners 22B, 22C, 22M and 22Y used in the image-forming device 10 may be a dry toner or a wet-suspended toner, or a nonmagnetic toner or a magnetic toner, as long as it is capable of being charged by friction. The housings 21B, 21C, 21M and 21Y of the developing units contain nonmagnetic monocomponent black toner, nonmagnetic monocomponent cyan toner, nonmagnetic monocomponent magenta toner and nonmagnetic monocomponent yellow toner, respectively. These toners 22B, 22C, 22M, and 22Y should preferably have electric charge opposite the electric charge of the fluororesin contained in the first coating layers 4A of the developing roller 1. The toners should be positively charged ones in this example. The positively charged toners may include positively charged nonmagnetic monocomponent polymerized toners. Specific examples of the positively charged toners may include binding resins obtained by polymerizing or copolymerizing acrylic monomers, such as monomers of acrylic acid and monomers of alkyl (meth)acrylates with 1 to 4 carbon atoms, or styrene monomers; and toners in the shape of a general sphere having toner particles that include colorants, charge control agents, and wax, and various additives. The colorants may include black, cyan, magenta, and yellow colorants. Examples of the charge control agents may include charge control resins obtained by copolymerizing ionic monomers with ionic functional groups such as ammonium salts, and monomers copolymerizable with the ionic monomers, such as styrene monomers and the acrylic monomers. Examples of the additives may include inorganic powder such as powder of metal oxides whose examples may be silica, aluminum oxide, titanium oxide, strontium titanate, cerium oxide, and magnesium oxide, powder of carbides, and powder of metal salts. The addition of the binding resins, whose kinds and properties should be suitably selected, makes the toners positively charged.

Particles of each of the toners 22B, 22C, 22M, and 22Y are normally in the shape of a sphere. The volume mean diameter of the toner particles is from 5 to 10 µm. The volume mean diameter may be measured by a method using electrical resistance by Coulter-counter. The diameter may be measured with a Coulter multisizer II measuring apparatus (with an aperture of 100 µm) manufactured by BECKMAN COULTER, Inc. or similar apparatuses.

The image-forming device 10 forms a color image on the recording material 16 in the following way: Firstly, in the developing unit B, an electrostatic latent image is formed on the surface of the image carrier 11B that has been charged with the static charger 12B with the aid of the exposing device 13B. Subsequently, the latent image is developed with the toner 22B supplied by the toner carrier 23B, and a corresponding black precursory image is formed. Then, the black precursory image is transferred to the surface of the recording material 16B so that a black image is formed on the material, while the recording material 16B is passing between the transfer device 14B and the image carrier 11B. A cyan image, a magenta image and a yellow image are superimposed on the black image, which has been developed from the latent image and transferred on the recording material, in the developing units C, M and Y in the same way as in the developing unit B. A color image thus appears on the recording material. Finally, the color image is fixed on the recording material 16 as a permanent image by the fixing device 30. A permanent color image is formed on the recording material 16 in this way.

The employment of the developing rollers 1 for the toner carriers 23 in this tandem image-forming device 10 effectively prevents toner leaks, essentially prevents the production of defective images, and such as images with fogging, which results in deterioration of the image quality, irrespective of the environments in which the image-forming device is placed. The employment of the developing rollers is also capable of maintaining a desired print density for a long time, and of preventing the occurrence of density irregularity in halftone images. Thus the developing rollers of the invention largely contribute to the formation of high quality images. Each of the development apparatuses 20B, 20C, 20M and 20Y is equipped with the developing roller 1 as the image carrier 23. Therefore the present invention provides developing rollers and development apparatuses capable of keeping the image quality high yet arresting toner leaks satisfactorily, which are incompatible properties or performances of the image-forming device.

Furthermore, the image-forming device 10 employs the developing rollers 1 for the image carriers 23. Thus the present invention also provides image-forming devices capable of keeping the image quality high yet arresting toner leaks satisfactorily, which are incompatible properties or performances of the image-forming device.

The developing roller, development apparatus, and image-forming device of the present invention are not limited to the foregoing examples, but are able to be variously modified within the gist and spirit of the present invention, or as long as the objective of the present invention is capable of being achieved. For example, there is no special limitation on the shape of the developing roller as long as it is in the shape of a cylinder. As shown in FIGS. 1 and 2, the developing roller may be in the shape of a so-called straight cylinder that has the generally same outer diameters from one end to the other end along the axis thereof. Or the developing roller may be in the shape of a so-called reverse camber wherein the cylinder has a larger outer diameter at around the ends thereof than at around the central portion thereof. Alternatively, the developing roller may be in the shape of a so-called camber wherein the cylinder has a smaller outer diameter at around the ends thereof than at around the central portion thereof.

The developing roller 1 of the present invention may have other layers between the elastic layer 3 and the coating layer 4. An example of the other layers may be a primer layer for sticking the elastic layer 3 and the urethane coating layer 4 together or closely contacting them with each other. Materials for the primer layer may include alkyd resin, phenol-modified or silicone-modified alkyd resin, oil-free alkyd resin, acrylic resin, silicone resin, epoxy resin, fluororesin, phenol resin, polyamide resin, urethane resin, and mixtures thereof. The crosslinking agent to cure and/or crosslink these resins may include, for example, isocyanate compounds, melamine compounds, epoxy compounds, peroxides, phenol compounds and hydrogensiloxanes. The primer layer may be formed so as to have a thickness, for example, from 0.1 to 10 µm.

The image-forming device 10 is an electrophotographic one in the foregoing explanation. The image-forming device of the present invention, however, is not limited to electrographic ones, but may be applied to electrostatic image-forming devices. Also, the image-forming device equipped with the developing rollers of the present invention is not limited to the tandem color image-forming device in which several image carriers, each equipped with a developing unit of a color, are arranged on the transfer and conveyor belt in series, but may be applied to other devices such as monochrome image-forming devices equipped with a single developing unit, and 4-cycle color image-forming devices in which a primary transfer of a precursory image with a color toner carried on an image carrier to an endless belt is repeated. Furthermore, in the foregoing explanation of the image-forming device 10, the toner 22 was a nonmagnetic monocomponent toner. However, magnetic monocomponent toners, nonmagnetic dicomponent toners and magnetic dicomponent toners may be used as well in the device of the present invention.

Although the image-forming device 10 is a so-called contact-type image-forming device, the device of the present invention may be a so-called non-contact type one where the toner carrier and the image carrier are arranged with a gap in between so that the surface of the toner carrier does not contact that of the image carrier.

Although the development apparatus of the image-forming device 10 is a so-called contact-type development apparatus, the apparatus of the present invention may be a so-called non-contact type one where the toner-amount adjuster and the toner carrier are arranged with a gap in between so that the outer circumferential face of the toner carrier does not contact the toner-amount adjuster.

EXAMPLES

Working Example 1

A shaft (made of SUM22, 10 mm in diameter and 275 mm in length) treated by electroless nickel plating was washed with ethanol. The surface of the washed shaft was coated with a silicone primer (product name: Primer No. 16, produced by Shin-Etsu Chemical Co., Ltd.). The shaft, which had been coated with the primer, was fired at a temperature of 150° C. for 10 minutes in a Geer oven. Subsequently, the fired was cooled at room temperature for not less than 30 minutes. A primer layer was thus formed on the surface of the shaft.

Then, 100 parts by mass of dimethylpolysiloxane both ends of which are blocked with dimethylvinylsiloxy groups (D) (degree of polymerization: 300), 1 part by mass of hydrophobic-treated fumed silica with a BET specific surface area of 110 $m^2/g$ (product name: R-972, produced by Nippon Aerosil Co., Ltd.), 40 parts by mass of diatomaceous earth with a mean particle size of 6 μm and a bulk density of 0.25 $g/cm^3$ (F) (product name: Oplite W-3005S, produced by Hokushu-Keisodo Co., Ltd.), and 5 parts by mass of acetylene black (G) (product name: DENKA BLACKHS-100, produced by DENKI KAGAKU KOGYO KABUSHIKI KAISHA) were placed in a planetary mixer. The contents in the mixer were stirred for 30 minutes, and were allowed to pass through a triple roll mill. The resultant was returned to the planetary mixer. 2.1 parts by mass of methylhydrogenpolysiloxane with Si—H groups at both ends and side chains (E) as a crosslinking agent (degree of polymerization: 17, Si—H content: 0.0060 mol/g), 0.1 part by mass of ethynylcyclohexanol as a reaction-controlling agent, and 0.1 part by mass of a platinum catalyst (H) (Pt content: 1%) were also introduced into the planetary mixer. The resulting contents were stirred and kneaded for 15 minutes. An addition-cure liquid electrically conductive silicone rubber composition was thus prepared. The prepared addition-cure liquid electrically conductive silicone rubber composition was formed into a precursory layer on the outer circumferential surface of the shaft 2 by liquid injection molding. During the liquid injection molding, the addition-cure liquid electrically conductive silicone rubber composition was heated at 150° C. for 10 minutes and cured. The cured precursory layer was polished. Thus an elastic layer 3 with an outer diameter of 20 mm was formed. The resulting elastic layer 3 had a JIS A hardness, a volume resistivity, and an electrical resistivity in the ranges specified hereinbefore.

A negatively charged "Emralon 345 Black" resin composition with the following composition, manufactured by Henkel Japan, Ltd., was prepared for the first resin composition capable of forming the first coating layers 4A.

a resin obtained by a reaction between polyol and γ-glycidoxypropyltrimethoxysilane: 48 parts by mass (43 parts by mass of polyol was allowed to react with 5 parts by mass of γ-glycidoxypropyltrimethoxysilane)

particles of a fluororesin (PTFE) with a particle diameter of 1 μm: 12 parts by mass (This amount corresponded to 25 parts by mass to 100 parts by mass of the resin)

carbon black with a particle diameter of 0.7 μm as electric conductivity agent: 3 parts by mass (This amount corresponded to 6 parts by mass to the aforementioned resin)

water: 40 parts by mass ionic liquid: 0 part by mass

A second resin composition capable of forming the second coating layer 4B was produced.

polyisocyanate (hexamethylene diisocyanate): 14 parts by mass condensed polyester polyol wherein the molar ratio of adipic acid to 1,6-hexanediol was [COOH/OH]=12/13:28 parts by mass (wherein the molar ratio of the polyisocyanate to the polyester polyol was [NCO/OH]=1.1/1)

$C_5H_5N^+$—$C_6H_{13}[(CF_3SO_2)_2N]^-$ (N-hexylpyridinium bis (trifluoromethanesulfonyl)imide) (manufactured by KANTO CHEMICAL CO., LTD.) as ionic liquid: 1 part by mass (This amount corresponded to 2.4 parts by mass to 100 parts by mass of the urethane-producing components)

carbon black with a particle diameter of 40 nm (product name: TOKABLACK #4500, manufactured by Tokai Carbon Co., Ltd.): 3 parts by mass (This amount corresponded to 7.1 part by mass of 100 parts by mass of the urethane-producing components)

dibutyltindilaurate (product name: di-n-butyltindilaurate, manufactured by SHOWA CHEMICAL CO., LTD.): 0.03 part by mass silica with a mean particle diameter of 1.5 μm (product name: ACEMATT OK-607, manufactured by Degussa AG): 4 parts by mass (This amount corresponded to 9.5 parts by mass to 100 parts by mass of the urethane-producing components)

A central portion of the outer circumferential face of the elastic layer 3 was masked, with the edge portions of the outer circumferential face, each edge portion having a width of 10 mm from the closer edge of the elastic layer 3 toward the central portion thereof, left unmasked. The second resin composition thus prepared was applied to the outer circumferential face of the elastic layer 3 by spray-coating and then heated at 160° C. for 30 minutes. A second coating layer 4B with a thickness of 20 μm was thus formed. Then, the outer circumferential face of the second coating layer 4B was masked. The first resin composition thus prepared was applied to the outer circumferential face of the elastic layer 3 by spray-coating and then heated at 160° C. for 30 minutes. First coating layers 4B with a thickness of 5 μm were formed. The developing roller of Working Example 1 was thus produced.

Working Examples 2 and 3

The developing rollers of Working Examples 2 and 3 were produced by the essentially same method as in Working Example 1, except that the amount of the fluororesin particles in the first resin composition was changed to 5 parts by mass (10 parts by mass to 100 parts by mass of the resin) and to 20 parts by mass (42 parts by mass to 100 parts by mass of the resin), respectively.

Working Examples 4-6

The developing rollers of Working Examples 4-6 were produced by the essentially same method as in Working Example 1, except that the amount of the ionic liquid was changed to 2 parts by mass (4.8 parts by mass to 100 parts by mass of the urethane-producing components), 4 parts by mass (9.5 parts by mass to 100 parts by mass of the urethane-producing components), and 8 parts by mass (19.0 parts by mass to 100 parts by mass of the urethane-producing components), respectively.

Working Examples 7-12

The developing rollers of Working Examples 7-12 were produced by the essentially same methods as respectively in Working Examples 1-6, except that $(CH_3)_3N^+C_3H_6$ $[(CF_3SO_2)_2N]^-$ (N,N,N-trimethyl-N-propylammonium bis (trifluoromethanesulfonyl)imide) (manufactured by KANTO CHEMICAL CO., LTD.), an amine ionic liquid, was used in place of the pyridinium ionic liquid.

Working Example 13

The developing roller of Working Example 13 was produced by the essentially same method as in Working Example 1, except for the following: The second resin composition was applied to the entire outer circumferential face of the elastic layer 3 by spray-coating and then heated at 160° C. for 30 minutes. A second coating layer 4B with a thickness of 20 µm was thus formed. Then, a central portion of the outer circumferential face of the second coating layer was masked, with the edge portions of the outer circumferential face, each edge portion having a width of 10 mm from the edge of the second coating layer toward the central portion thereof, left unmasked. The first resin composition was applied to the outer circumferential face of the cured second resin composition by spray-coating and then heated at 160° C. for 30 minutes. First coating layers 4B with a thickness of 5 µm were formed. The total thickness of the first coating layers was 25 µm.

Comparative Example 1

The developing roller of Comparative Example 1 was produced by the essentially same method as in Working Example 1, except the second resin composition did not include the pyridinium ionic liquid.

Comparative Example 2

The developing roller of Comparative Example 2 was produced by the essentially same method as in Working Example 1, except the first coating layers 4A were not formed.

Comparative Example 3

The developing roller of Comparative Example 3 was produced by the essentially same method as in Working Example 1, except the carbon black was not added to the first resin composition.

Comparative Example 4

The developing roller of Comparative Example 4 was produced by the essentially same method as in Working Example 1, except the pyridinium ionic liquid was replaced with 1-ethyl-3-methylimidazolium tetrafluoroborate with a melting point of 14.6° C. (manufactured by Aldrich Co. LLC.) and the first coating layers were not formed.

(Evaluation of Fogging in Low Humidity Environment)

Each of the developing rollers, produced in the working and comparative examples, was installed in an electrophotographic printer using nonmagnetic monocomponent toners (product name: HL-4040CN, manufactured by Brother Industries, Ltd.). Then, the roller-installed printer was left for 24 hours in a low humidity environment, or at 23° C. and 10% relative humidity. This printer was a "contact-type image-forming device", and the development apparatus installed in this printer was a "contact-type development apparatus". Positively charged toners were included in the development apparatus. Then, the print options of the printer were selected in the following way: The paper quality was set to "thick plain paper", the printing quality to "standard", and the color to "standard". One hundred copies of a solid white image were continuously printed in a monochrome mode. Immediately after this printing, a copy of the solid white image was printed in a color mode. Printing blots on the resulting solid white print were visually checked as fogging. When there was no blot on the entire image, it was graded as Excellent, which is shown as "⊚" in Table 1 below. When there were such a small number of blots on the solid white print that they would not cause practical problems, it was graded as Fair, which is shown as "○" in the table. When there was no blot on the central region of the solid white image which the second coating layer 4B of each developing roller contacted but there were such a number of blots on both edge portions of the solid white image which the first coating layers 4A of each developing roller contacted that the image could not be acceptable from a practical viewpoint, it was graded as Fair/Failure, which is shown as "○x" in the table. When there were such a number of blots on the image that the image could not be acceptable from a practical viewpoint, it was graded as Failure, which is shown as "x" in the table. The results of the evaluation are shown in Table 1 in the column of "Evaluation of fogging", or column I.

(Evaluation of Image Quality of Halftone Images)

The printer (product name: HL-4040CN, manufactured by Brother Industries, Ltd.), in which each of the developing rollers had been installed, was connected with a personal computer. Then, the printer was left for 24 hours in a test environment, or at 23° C. and 10% relative humidity. Then, the print options of the printer were selected in the following way: The paper quality was set to "thick plain paper", the printing quality to "standard", the color to "standard", and other options to "default". A monochrome image with a color consistency that was essentially the same as '18% gray' was created on the screen of the personal computer with the spreadsheet program named "Excel" produced by Microsoft, so that the monochrome image would be printed on the entire print area of the sheet. A copy of this monochrome image was printed as a halftone image in the monochrome mode. The homogeneity of the printed halftone image was checked by the eye. When the halftone image was homogeneous, without density irregularity, it was graded as Excellent, which is shown as "⊚" in Table 1 below. When the halftone image had such a little density irregularity that it would not cause practical problems, it was graded as Fair, which is shown as "○" in the table. When the image had such considerable density irregularity that the image could not be acceptable from a practical viewpoint, it was graded as Failure, which is shown as "x" in the table. The results of the evaluation are shown in Table 1 in the column of "Evaluation of image quality", or column J.

(Printing Durability Test)

The image quality after the printing durability test that was carried out under the following conditions was evaluated. Each of the developing rollers, produced in the working and comparative examples, was installed in an electrophotographic printer using nonmagnetic monocomponent toners (product name: HL-4040CN, manufactured by Brother Industries, Ltd.). Then, the roller-installed printer was left for 24 hours in a low humidity environment, or at 23° C. and 10% relative humidity. Then, the print options of the printer were selected in the following way: The paper quality was set to "thick plain paper", the printing quality to "standard", and the color to "standard". Ten thousand copies of a solid black image were continuously printed in a monochrome mode on a portion of A4 size paper sheets, the portion with an area of 5% to the total area of an A4 size paper sheet. From the many sheets with the print, the second sheet, the five hundredth sheet, and the ten thousandth sheet were selected. The print density of the images on these sheets was measured by the usual way. When the difference between the print densities of the images on these sheets was not more than 0.2, the printing durability was graded as Excellent, which is shown as "⊚" in Table 1 below. When the difference between the print densities of the images on these sheets was from more than 0.2 to less than 0.3, the printing durability was graded as Good, which is shown as "○" in Table 1 below. When the difference between the print densities of the images on these sheets was from not less than 0.3 to less than 0.4, the printing durability was graded as Fair, which is shown as "○x" in Table 1 below. When the difference between the print densities of the images on these sheets was from not less than 0.4, the printing durability was graded as Failure, which is shown as "x" in Table 1 below. When the difference is not less than 0.4, images printed after continuous printing of images could not be acceptable from a practical viewpoint. The results of the evaluation are shown in Table 1 in the column of "Printing Durability Test", or column K.

(Evaluation of Toner Leaks in High-Humidity Environment)

Five developing rollers for each of the produced in the working and comparative examples were prepared. They were installed as developing rollers in a contact-type color image-forming device (product name: TN-290, manufactured by Brother Industries, Ltd.), shown in FIG. 3. The toners and toner-controlling members that were attached to the device were used in this test. The toners were positively charged.

The inside of the contact-type color image-forming device equipped with the developing rollers was adjusted to a high-humidity condition where the temperature was 30° C. and the relative humidity was 80%. One thousand copies of a solid white image were printed on the entire single side of each of the A4 size paper sheets in a color mode. Subsequently, the image-forming device was dismantled. It was visually checked whether the toners were leaked from the development apparatuses to the outside. When toner was not observed outside the development apparatus with all of the five developing rollers produced in each working or comparative example, the development apparatus with the rollers was graded as Excellent, which is shown as "⊚" in Table 1 below. When a trace amount of toner adhered to the members surrounding the development apparatus with all of the five developing rollers produced in each working or comparative example, the development apparatus with the rollers was graded as Failure, which is shown as "x" in Table 1 below.

TABLE 1

|  | First coating layer | | | | Second coating layer | | | |
|---|---|---|---|---|---|---|---|---|
|  | A[3] | B[4] | C[5] | D[6] | E[7] | F[8] | G[9] | H[10] |
| W.E.[1] 1 | 25 / 1 | 0.7 / 6 | 10 | 5 | 2.4 | 7.1 | 9.5 | 20 |
| W.E. 2 | 10 / 1 | 0.7 / 6 | 10 | 5 | 2.4 | 7.1 | 9.5 | 20 |
| W.E. 3 | 42 / 1 | 0.7 / 6 | 10 | 5 | 2.4 | 7.1 | 9.5 | 20 |
| W.E. 4 | 25 / 1 | 0.7 / 6 | 10 | 5 | 4.8 | 7.1 | 9.5 | 20 |
| W.E. 5 | 25 / 1 | 0.7 / 6 | 10 | 5 | 9.5 | 7.1 | 9.5 | 20 |
| W.E. 6 | 25 / 1 | 0.7 / 6 | 10 | 5 | 19 | 7.1 | 9.5 | 20 |
| W.E. 7 | 25 / 1 | 0.7 / 6 | 10 | 5 | 2.4 | 7.1 | 9.5 | 20 |
| W.E. 8 | 10 / 1 | 0.7 / 6 | 10 | 5 | 2.4 | 7.1 | 9.5 | 20 |
| W.E. 9 | 42 / 1 | 0.7 / 6 | 10 | 5 | 2.4 | 7.1 | 9.5 | 20 |
| W.E. 10 | 25 / 1 | 0.7 / 6 | 10 | 5 | 4.8 | 7.1 | 9.5 | 20 |
| W.E. 11 | 25 / 1 | 0.7 / 6 | 10 | 5 | 9.5 | 7.1 | 9.5 | 20 |
| W.E. 12 | 25 / 1 | 0.7 / 6 | 10 | 5 | 19 | 7.1 | 9.5 | 20 |
| W.E. 13 | 25 / 1 | 0.7 / 6 | 10 | 5 | 2.4 | 7.1 | 9.5 | 20 |
| C.E.[2] 1 | 25 / 1 | 0.7 / 6 | 10 | 5 | — | 7.1 | 9.5 | 20 |
| C.E. 2 | — | — | — | — | 2.4 | 7.1 | 9.5 | 20 |
| C.E. 3 | 25 / 1 | — | 10 | 5 | — | 7.1 | 9.5 | 20 |
| C.E. 4 | — | — | — | — | 2.4(*) | 7.1 | 9.5 | 20 |

|  | I[11] | J[12] | K[13] | L[14] |
|---|---|---|---|---|
| W.E. 1 | ○ | ○ | ○x | ⊚ |
| W.E. 2 | ○ | ○ | ○x | ⊚ |
| W.E. 3 | ○ | ○ | ○x | ⊚ |
| W.E. 4 | ⊚ | ⊚ | ○ | ⊚ |
| W.E. 5 | ⊚ | ⊚ | ⊚ | ⊚ |
| W.E. 6 | ⊚ | ⊚ | ⊚ | ⊚ |
| W.E. 7 | ○ | ○ | ○x | ⊚ |
| W.E. 8 | ○ | ○ | ○x | ⊚ |
| W.E. 9 | ○ | ○ | ○x | ⊚ |
| W.E. 10 | ⊚ | ⊚ | ○ | ⊚ |
| W.E. 11 | ⊚ | ⊚ | ⊚ | ⊚ |
| W.E. 12 | ⊚ | ⊚ | ⊚ | ⊚ |
| W.E. 13 | ○ | ○ | ○x | ⊚ |
| C.E. 1 | x | x | x | ⊚ |
| C.E. 2 | ○x | ○ | ○x | x |
| C.E. 3 | ○x | ○ | ○x | ⊚ |
| C.E. 4 | ○x | ○ | ○x | x |

(*)1-ethyl-3-methylimidazolium tetrafluoroborate

Notes:
[1]"W.E." stands for Working Example.
[2]"C.E." stands for Comparative Example.
[3]The data about the fluororesin particles are shown in column A. The upper number in each cell denotes the amount of the fluororesin particles in parts by mass to 100 parts by mass of the resin. The lower number denotes the particle diameter of the fluororesin particles.
[4]The data about the electric conductivity agent are shown in column B. The upper number in each cell denotes the particle diameter of the electric conductivity agent. The lower number denotes the amount of the agent in parts by mass to 100 parts by mass of the resin.
[5]"C" represents the width in mm of the portion coated with the first resin composition.
[6]"D" represents the thickness in μm of each first coating layer.
[7]"E" represents the amount of the ionic liquid in parts by mass to 100 parts by mass of the urethane resin.
[8]"F" represents the amount of the electric conductivity agent in parts by mass to 100 parts by mass of the urethane resin.
[9]"G" represents the amount of the filler particles in parts by mass to 100 parts by mass of the urethane resin.
[10]"H" represents the thickness of the second coating layer.
[11]"I" represents the evaluation of fogging in the low-humidity environment.
[12]"J" represents the evaluation of the image quality of the halftone images.
[13]"K" represents the results of the print durability test.
[14]"L" represents the evaluation of toner leaks in a high-humidity environment.

INDUSTRIAL APPLICABILITY

The developing roller according to the present invention is suitably used for the image-forming device or the development apparatuses built in the image-forming device of printers such as laser printers and video printers, copying machines, facsimile machines and all-in-one printers with the functions of these printers and machines. The developing roller of the present invention is especially appropriately applied to today's high-definition image-forming devices and developing rollers of development apparatuses that are mounted in those image-forming devices.

EXPLANATION OF REFERENCE NUMERALS

| | |
|---|---|
| 1 | developing roller |
| 2 | shaft |
| 3 | elastic layer |
| 4 | coating layer |
| 4A | first coating layer |
| 4B | second coating layer |
| 10 | image-forming device |
| 11B, 11C, 11M, 11Y | image carrier |
| 12B, 12C, 12M, 12Y | static charger |
| 13B, 13C, 13M, 13Y | exposing device |
| 14B, 14C, 14M, 14Y | transfer device |
| 15B, 15C, 15M, 15Y | cleaner |
| 16 | recording material |
| 20 | development apparatus |
| 21B, 21C, 21M, 21Y | housing |
| 22B, 22C, 22M, 22Y | toner |
| 23B, 23C, 23M, 23Y | toner carrier |
| 24, 24B, 24C, 24M, 24Y | toner-controlling member |
| 25 | toner-sealing member |
| 30 | fixing device |
| 31 | fixing roller |
| 32 | pressure roller |
| 33 | endless belt-supporting roller |
| 35 | opening |
| 36 | endless belt |
| 41 | cassette |
| 42 | supporting roller |
| B, C, M, Y | developing unit |

We claim:

1. A developing roller comprising an elastic layer formed on an outer circumferential face of a shaft and a coating layer formed on an outer circumferential face of the elastic layer, wherein the coating layer comprises first coating layers formed at respective edges across the elastic layer, and a second coating layer formed between the first coating layers, and wherein the first coating layers contain a resin obtained through a reaction of a polyol with a silane-coupling agent, particles of a fluororesin, and an electric conductivity agent, wherein the first coating layers do not essentially contain ionic liquid; and the second coating layer contains a urethane resin, at least one ionic liquid selected from the group consisting of pyridinium ionic liquids and amine ionic liquids, an electric conductivity agent, and filler particles.

2. The developing roller according to claim 1, wherein an amount of the particles of the fluororesin is from 10 to 50 parts by mass to 100 parts by mass of the resin.

3. The developing roller according to claim 1, wherein an amount of the ionic liquid contained in the second coating layer is from 1 to 20 parts by mass to 100 parts by mass of the urethane resin.

4. A development apparatus comprising the developing roller according to claim 1, sealing members for preventing toner leaks, the members sliding on respective edges of an outer circumferential face of the developing roller, and a toner-controlling member extending along the axis of the developing roller and contacting the circumferential face thereof to control a thickness of the toner carried by the developing roller.

5. The development apparatus according to claim 4, wherein each of the first coating layers of the developing roller is arranged so that the first coating layer slides on one of the seal members and on the toner-controlling member.

6. An image-forming device comprising the development apparatus according to claim 4, and an image carrier held so as to face the developing roller.

7. The developing roller according to claim 2, wherein an amount of the ionic liquid contained in the second coating layer is from 1 to 20 parts by mass to 100 parts by mass of the urethane resin.

8. The development apparatus according to claim 4, wherein an amount of the particles of the fluororesin contained in the first coating layer is from 10 to 50 parts by mass to 100 parts by mass of the resin, and an amount of the ionic liquid contained in the second coating layer is from 1 to 20 parts by mass to 100 parts by mass of the urethane resin.

9. The development apparatus according to claim 5, wherein an amount of the particles of the fluororesin contained in the first coating layer is from 10 to 50 parts by mass to 100 parts by mass of the resin, and an amount of the ionic liquid contained in the second coating layer is from 1 to 20 parts by mass to 100 parts by mass of the urethane resin.

10. The image-forming device comprising the development apparatus according to claim 6, wherein each of the first coating layers of the developing roller is arranged so that the first coating layer slides on one of the seal members and on the toner-controlling member.

* * * * *